(12) United States Patent
Lemanski

(10) Patent No.: US 7,147,583 B2
(45) Date of Patent: Dec. 12, 2006

(54) VARIABLE SPEED POWER TRANSMISSION

(76) Inventor: Alphonse J. Lemanski, 1 Kimberly Dr., Huntington, CT (US) 06484

( * ) Notice: Subject to any disclaimer, the term of this patent is extended or adjusted under 35 U.S.C. 154(b) by 178 days.

(21) Appl. No.: 10/881,351

(22) Filed: Jun. 30, 2004

(65) Prior Publication Data

US 2005/0037886 A1    Feb. 17, 2005

Related U.S. Application Data

(63) Continuation-in-part of application No. 10/079,801, filed on Feb. 19, 2002, now Pat. No. 6,764,423.

(51) Int. Cl.
  *F16H 23/00* (2006.01)
  *F16H 3/70* (2006.01)
  *F16H 35/02* (2006.01)

(52) U.S. Cl. .................. 475/164; 475/169; 74/640; 74/393

(58) Field of Classification Search .............. 475/163, 475/164, 169, 171, 149, 1, 3, 4, 5; 74/640, 74/650
See application file for complete search history.

(56) References Cited

U.S. PATENT DOCUMENTS

| | | | |
|---|---|---|---|
| 3,094,880 A | 6/1963 | Maroth | |
| 3,595,103 A * | 7/1971 | Wildhaber | 74/640 |
| 3,895,540 A | 7/1975 | Davidson | |
| 3,935,750 A | 2/1976 | Maroth | |
| 4,281,566 A * | 8/1981 | Brusasco | 475/164 |
| 4,620,457 A | 11/1986 | Distin et al. | |
| 4,715,249 A | 12/1987 | Tibbals, Jr. | |
| 4,966,573 A * | 10/1990 | Yokoi | 475/164 |
| 6,286,391 B1 * | 9/2001 | Gassmann | 74/650 |
| 6,348,021 B1 * | 2/2002 | Lemanski | 475/164 |

* cited by examiner

*Primary Examiner*—Tisha Lewis
(74) *Attorney, Agent, or Firm*—Monahan & Costello, LLC

(57) ABSTRACT

Continuously variable speed power transmission with and without integrated motor/generator components. The transmission has an input member rotatable about an input axis, an output member rotatable about an output axis, a reaction control rotor with optional integrated motor/generator components for selective rotation about the input axis, a pericyclic motion converter mounted for pericyclic motion about the input axis, and a control means for selectively adjusting the rate of rotation of the reaction control rotor relative to the input member. A bevel gear construction is a preferred embodiment of the transmission. A method for varying speed ratios using pericyclic motion is described.

17 Claims, 19 Drawing Sheets

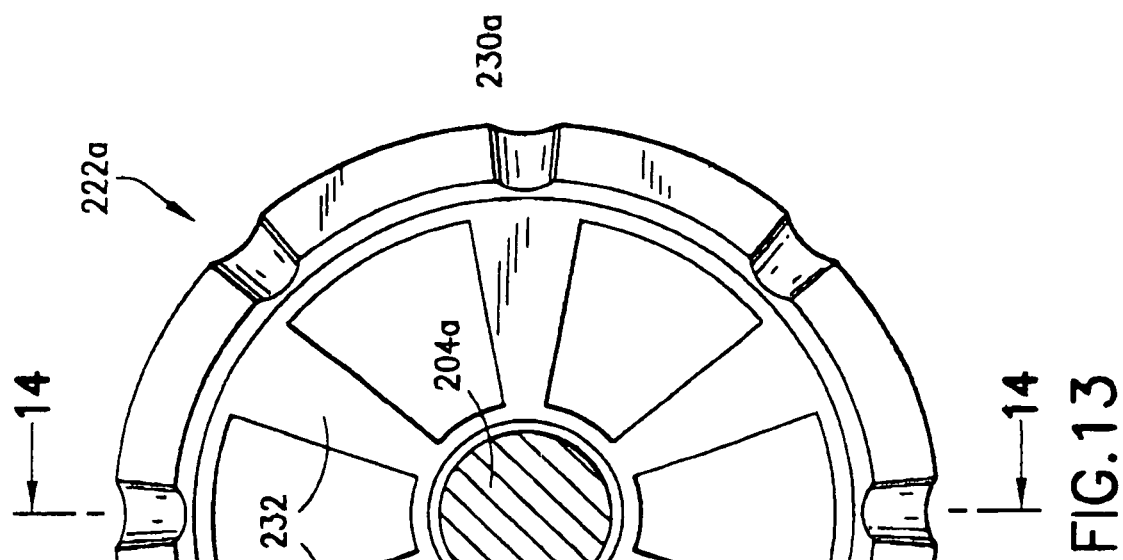
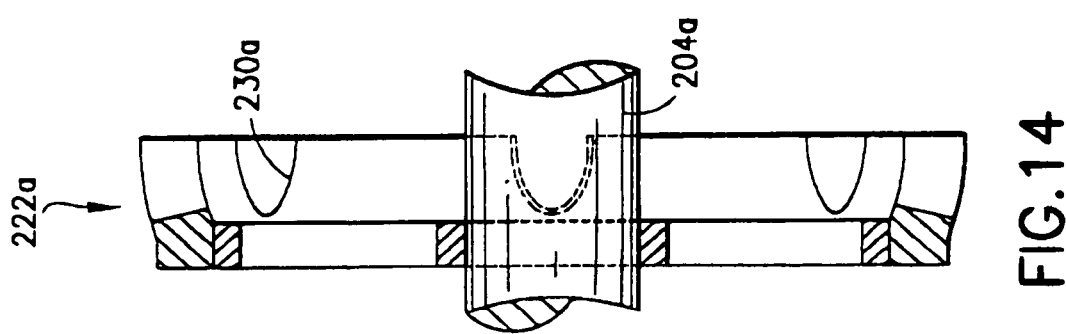

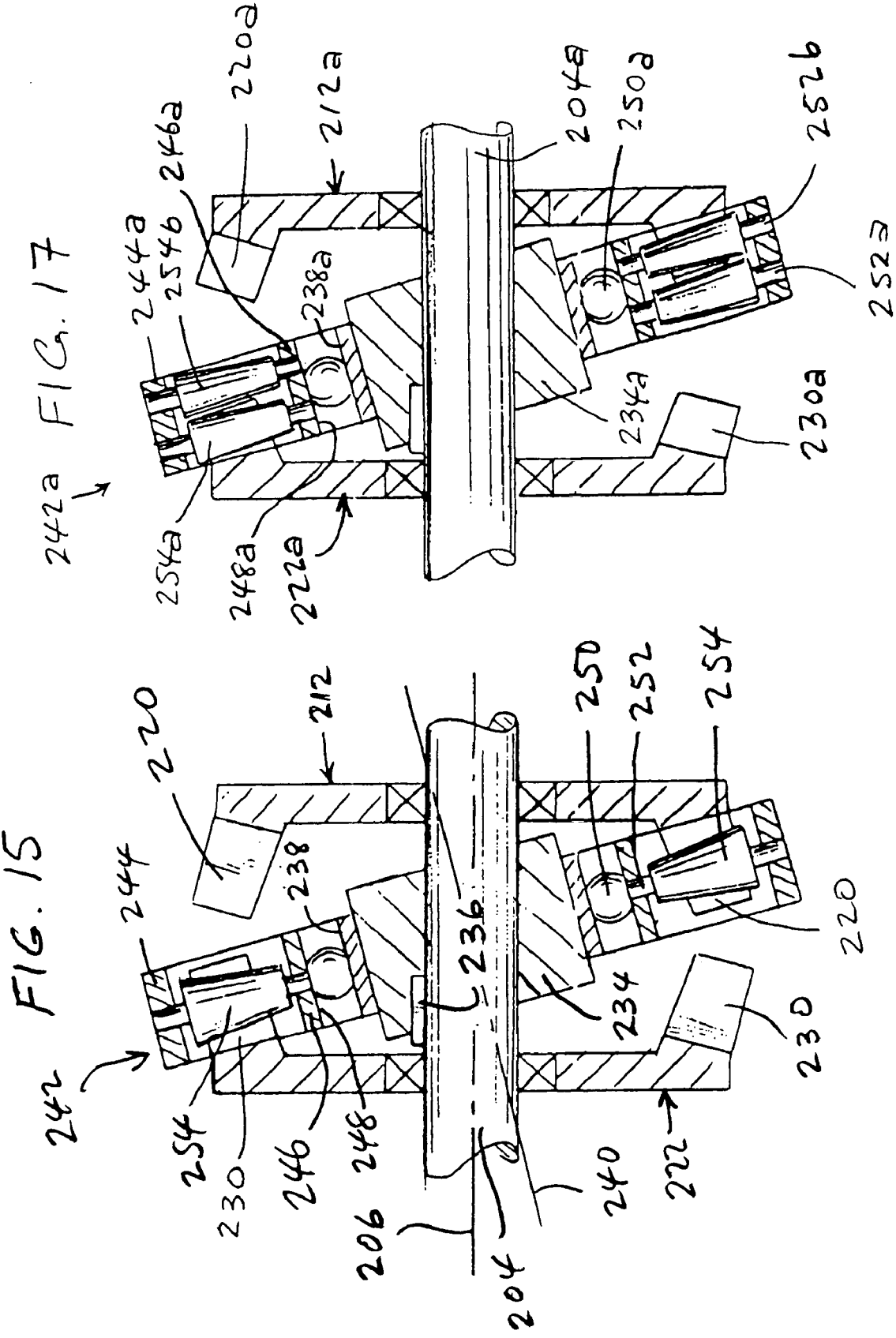

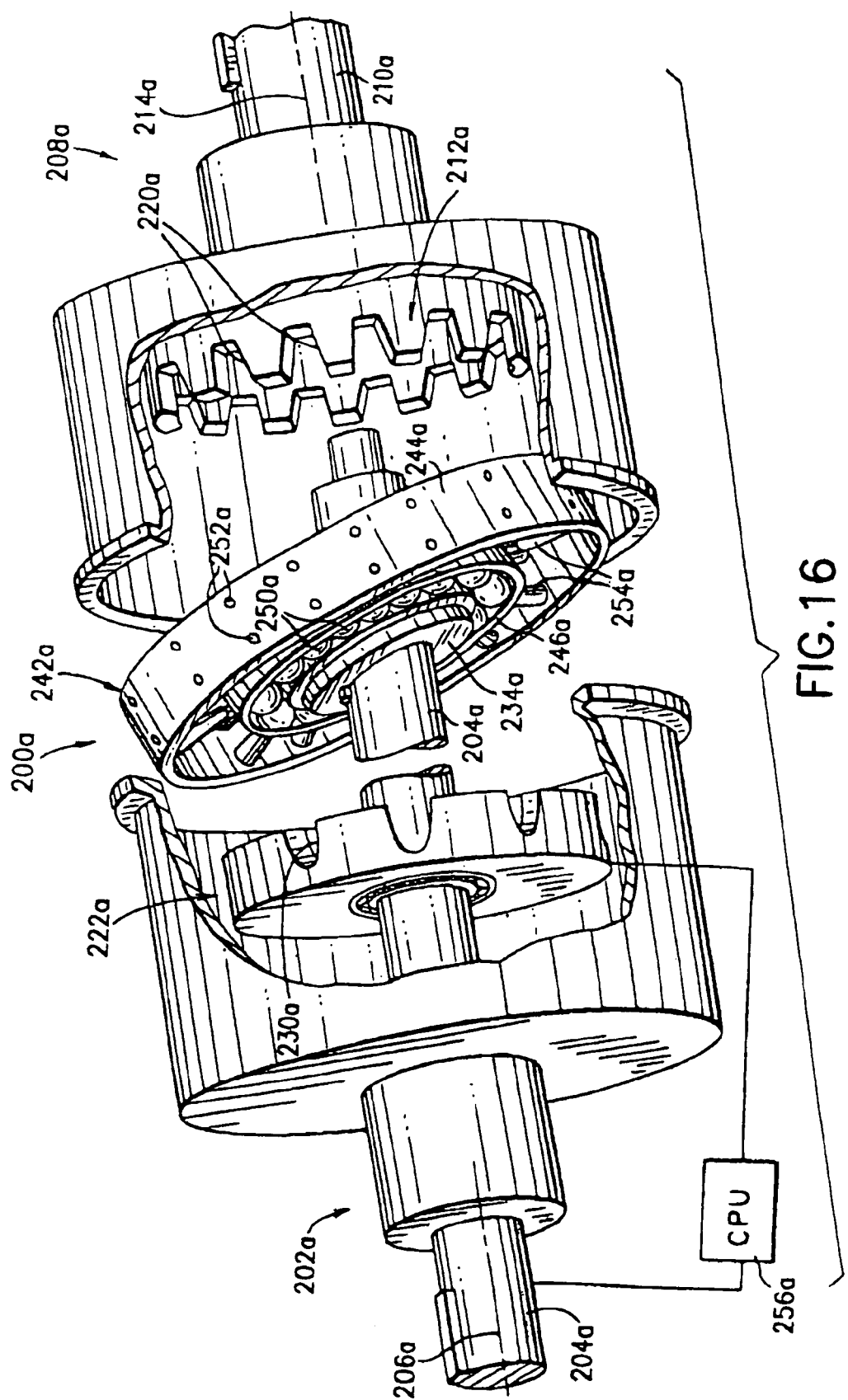

VARIABLE SPEED POWER TRANSMISSION

The present application is a continuation-in-part application of application Ser. No. 10/079,801 of Alphonse J. Lemanski filed Feb. 19, 2002 now U.S. Pat. No. 6,764,423, entitled "Variable Speed Power Transmission System".

BACKGROUND OF THE INVENTION

1. Field of the Invention

The present invention relates to power transmission systems and, more particularly, to such systems which are of the all rolling, positive contacting, variable speed type and, still more particularly, wherein extensive load sharing occurs among the load transmitting members.

2. Prior Art

The present invention relates to a transmission system which incorporates oscillator members. It is known in the art to use a wobbling member known as a nutator to effect a fixed gear reduction or speed reduction/increase in a transmission system. Generally representative of the pertinent prior art as it pertains to the present invention U.S. Pat. No. 4,620,457 to Distin et al., U.S. Pat. No. 3,590,659 to Maroth, U.S. Pat. No. 3,935,750 to Maroth, and U.S. Pat. No. 1,748,907 to Vallance.

U.S. Pat. No. 4,620,457 to Distin et al. discloses a torque transmitting gearing system of the nutating type equipped with a nutating idler member which is in torque transmitting engagement with both a stator and an output gear. Torque transmission between the respective elements is achieved via respective series of rolling, torque transmitting elements in the form of tapered rollers. The rollers are maintained in substantially continuous contact with both their respective driving and driven raceway surfaces, which are formed with trochoidal curvature. Within a given pair of coacting gear surfaces, one surface is shaped with epitrochoidal curvature, and the other with hypotrochoidal curvature.

U.S. Pat. No. 3,590,659 to Maroth discloses a speed changer apparatus with a nutating member having force transfer members in the form of roller elements which nutatively contact inclined surfaces on an action member coupled to an output shaft. The nutating member is prevented from rotation by stationary mounted inclined surfaces which are contacted by force transfer members/The nutating member is peripherally engaged by a rotating driving member coupled to a rotating input shaft. The driving member is provided with a surface shaped to impart nutative motion to the nutating member. Superior axial balance is obtained by operating a pair of nutating sections with opposing axial motions with respect to each other.

U.S. Pat. No. 1,748,907 to Vallance discloses apparatus for transmitting rotary motion from one rotatable element to another rotatable element using a plate, ring, or similar component connected to the rotatable elements using such a construction that rotation of one of the elements causes the plate, ring, or similar component to tilt or oscillate in such a manner that every point in its circumference moves in a lemniscate path and effects rotation of the other one of the elements at an invariable reduced speed or at an invariable increased speed. In greater detail, the Vallance patent discloses a speed reduction mechanism in the form of a nutating gear system, wherein an input shaft initiates wobbling motion of an intermediate member 7, via the engagement of a portion 9b of the intermediate member with an angled or canted portion of the input shaft 2. Radially outwardly on the member 7 are disposed a train of teeth 10 which engage stator teeth 11 formed on a portion of the stationary housing 5. Inside of the cup-member 7 are arranged a number of hemispherical recesses 7b, in which are fixedly seated a like number of balls 8. These balls are in turn in engagement with a continuous curved groove 6b formed in an output member 6. As with other known nutating systems, the engagement between stator teeth 10, 11 prevents the intermediate member 7 from rotating during nutation, so that output rotation is effected solely by means of the engagement between the fixed balls and the groove. As the idler member 7 nutates, the balls 8 successively cam the element 6 rotationally by engaging the walls of the curved groove.

It was with knowledge of the foregoing state of the technology that the present invention has been conceived and is now reduced to practice.

SUMMARY OF THE INVENTION

The present invention discloses, in one embodiment, a continuously variable speed power transmission includes a rotatable input member, a rotatable output member including a plurality of rearwardly directed output face cams thereon. A reaction control rotor mounted for selective rotation about the input axis includes a plurality of forwardly directed reaction rotor face cams thereon in opposition to the output face cams on the output member. A pericyclic motion converter rotatably mounted for pericyclic motion about the input axis includes a plurality of load transmitting follower members thereon simultaneously engageable with the output rotor face cams and with the reaction rotor face cams. An electronic control means selectively adjusts the rate of rotation of the reaction control rotor relative to the input member such that relative rotation between the reaction control rotor and the input member results in oscillation, nutation, rotation and differential motion of the pericyclic motion converter about the input axis and thereby results in a continuously variable change of ratio of the rotational speed of the output member relative to the input member. In another embodiment, the pericyclic motion converter is rotatably mounted on an encompassing housing. In either event, the load transmitting members of the pericyclic motion converter kinematically under pure rolling contact traverse a mathematically higher order spherical path of action during each revolution of the input member.

The present invention is an all rolling positive contacting mechanical variable speed, power transmission system. It utilizes the fundamental principles of high load capacity and torque transmission efficiency facilitated by high precision rolling element bearings. The concentrated rolling surface contact conditions that prevail in the present invention during torque transmission also facilitates its operation with minimal fluid lubricant. The unique design of conjugate load bearing surfaces in the present invention permits the use of tribologically robust materials and surface film transfer conditions to take place in the concentrated roller contacts. All other known mechanical power transmission systems that employ nutation and various types of gearing arrangements, balls and rollers which engage face cam tooth type surfaces do not possess the unique concentrated rolling conjugate surface contact conditions that are incorporated in the present invention. The present invention is thereby capable of much higher torque density and power transmission efficiency than other known continuously variable mechanical power transmission systems.

The transmission of the invention can be employed in many devices and includes an input member, a reaction control rotor member, a pericyclic motion converter member driven by the input member, an output rotor member driven by the pericyclic motion converter member, in which the rotational speed of the reaction control rotor member and or the pericyclic motion control member can be controlled independent of the input member; thereby, allowing the speed reduction/increase at the output drive member to vary. More specifically, the invention is an all rolling positive contacting mechanical variable speed, power transmission system. It utilizes the fundamental principles of high load capacity and torque transmission efficiency of high precision rolling element bearings. The concentrated rolling surface contact conditions that prevail in the present invention during torque transmission facilitates its operation with minimal fluid lubricant. The unique design of conjugate load bearing surfaces in the present invention permits the use of tribologically robust materials and surface film transfer conditions to take place in the concentrated roller contacts. All other mechanical power transmission systems that employ various types of gearing arrangements, balls or rollers which engage face cam tooth type surfaces do not possess the unique concentrated rolling conjugate surface contact condition that is incorporated in the present invention. The present invention is thereby capable of higher torque density and power transmission efficiency than other mechanical power transmission systems.

A primary feature, then, of the present invention is the provision of a variable speed power transmission which not only produces a certain gear reduction or speed reduction/increase in a transmission using such a pericyclic motion converter member that operates to vary the gear reduction or speed reduction/increase in the transmission.

Another feature of the present invention is the provision of such a transmission which results in a continuously variable change of ratio of the rotational speed of the output member relative to the input member.

Yet another feature of the present invention is the provision of such a power transmission which includes an input member rotatable about an input axis, an output member rotatable about an output axis including a plurality of rearwardly directed output face cams thereon, a reaction control rotor mounted for selective rotation about the input axis including a plurality of forwardly directed reaction face cams thereon in opposition to the output face cams on the output rotor member, a pericyclic motion converter rotatably mounted for pericyclic motion about the input axis including a plurality of load transmitting follower members thereon simultaneously engageable with the output rotor face cams and with the reaction control rotor face cams, and an electronic controller for selectively adjusting the rate of rotation of the reaction control rotor relative to the input member whereby relative rotation between the reaction control rotor and the input member results in pericyclic motion of the pericyclic motion converter about the input axis and thereby results in a continuously variable change of ratio of the rotational speed of the output member relative to the input member.

Still another feature of the present invention is the provision of such a power transmission in which the output rotor face cams, the reaction control rotor face cams, and the follower members of the pericyclic motion converter all are replaced with embodied bevel face type gear teeth including internal bevel face type gear teeth having a pitch angle greater than 90° on both rotors and external bevel type face teeth on both sides (back-to-back) of the pericyclic motion converter member.

Yet a further feature of the present invention is the provision of such a transmission having the construction of the pericyclic motion converter being rotatably mounted on an encompassing housing.

Still another feature of the present invention is the provision of such a transmission in which the load transmitting members of the pericyclic motion converter kinematically under pure rolling contact traverse a mathematically higher order spherical path of action during each revolution of the input member.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

The present invention provides a method for continuously varying the ratio of rotational speed of an input shaft member relative to the rotational speed of an output shaft member of a pericyclic power transmission, wherein said pericyclic transmission comprises an input shaft member, an output shaft member, a pericyclic motion converter member rotably mounted on said input shaft at a selected fixed design angle, a reaction control rotor member journaled to said input shaft member and an electronic controller means, an output rotor member fixed to said output shaft member, wherein said pericyclic motion converter member is in simultaneous driving contact with said reaction control rotor member and said output rotor member, said method comprising the steps of: inputting mechanical torque and rotational speed to said input shaft member and thereby to said pericyclic motion converter member mounted thereon to convert said mechanical torque and rotational speed to torque and pericyclic motion; and controlling the rotation of said reaction control rotor with said electronic controller means; transferring said mechanical torque and converting said input shaft rotation to pericyclic motion of said pericyclic motion converter to rotational speed and torque of said output rotor member and said output shaft member affixed thereto, thereby varying the rotational speed of said input shaft member relative to the rotational speed of said output shaft member. In the method of the invention, the rotational speed of the input shaft member may be constant and the rotational speed of said output shaft member may be variable. Also, the rotational speed of the input shaft member may be variable and the rotational speed of the output shaft member may be constant. In a preferred embodiment of the invention, the reaction control rotor member consists of a plurality of forwardly directed internal face type bevel gear teeth, the output rotor member consists of a plurality of rearwardly directed internal face type bevel gear teeth, and the pericyclic motion converter member consists of a plurality of back-to-back conjugate embodied face type external bevel gear teeth. In another embodiment, the reaction control rotor member consists of a plurality of forwardly directed reaction face cams, the output rotor member consists of a plurality of rearwardly directed output face cams, and the pericyclic motion converter member consists of a plurality of load transmitting follower members. In the method of the invention, the pericyclic transmission may further comprise integrated or embodied motor/generator components. The reaction control rotor member and the output rotor member are preferebly selected from the group consisting of a plurality of internal bevel type face gear teeth, and a plurality of reaction face cams; the pericyclic motion converter is preferably selected from the group consisting of a plurality of back-to-back conjugate embodied face type external bevel gear teeth, and a plurality of load transmitting follower members; and wherein if the pericyclic motion converter consists of back-to-back conjugate embodied face type external bevel gear teeth, then the reaction control rotor member consists of forwardly directed internal face gear teeth and the output rotor member each consist of rearwardly directed internal face gear teeth; and wherein if the pericyclic motion converter consists of a plurality of load transmitting follower members, then the reaction control rotor member consists of a plurality of forwardly directed face cams and the output rotor member consists of a plurality of rearwardly directed face cams. The method may further comprising the step of generating electric energy while simultaneously varying the rotational speed of the input shaft member relative to the rotational speed of the output shaft member. Also, the method may further comprising the step of recycling at least a portion of the generated electric energy to power the reaction control rotor member.

In the method the reaction control rotor member and the output rotor member may comprise a plurality of embodied face type external bevel gear teeth with profile geometries that comprise parallel tooth whole depth, extended profile addendums, and congruent lengthwise curvature modification; the pericyclic motion converter member may preferably comprise back-to-back conjugate embodied face type external bevel gear teeth and profile geometries that consist of parallel tooth whole depth, extended profile addendums, and congruent tooth lengthwise curvature modifications.

In the method, where the reaction control rotor member and the output rotor member comprise a plurality of embodied face type external bevel gear teeth with profile geometries that consist of parallel tooth whole depth, extended profile addendums, and congruent lengthwise curvature modification; the pericyclic motion converter member comprises back-to-back conjugate embodied face type external bevel gear teeth that comprise profile geometries of parallel tooth whole depth, extended profile addendums, and congruent tooth lengthwise curvature modifications.

BRIEF DESCRIPTION OF THE DRAWINGS

The foregoing aspects and other features of the present invention are explained in the following description, taken in connection with the accompanying drawings, wherein:

FIG. 13 is a detail elevation view illustrating a reaction control rotor which is a component of the power transmission illustrated in FIG. 8;

FIG. 14 is a detail side elevation view of the component illustrated in FIG. 13;

FIG. 15 is a detail elevation view, in section, of a pericyclic motion converter which is a component illustrated in FIG. 8;

FIG. 16 is an exploded perspective view, partially cut away and shown in section, of still another embodiment of the continuously variable power transmission of the present invention; and FIG. 17 is a detail elevation view, in section, of a modified pericyclic motion converter which is a component illustrated in FIG. 16.

DETAILED DESCRIPTION OF THE PREFERRED EMBODIMENTS

Figure 1:
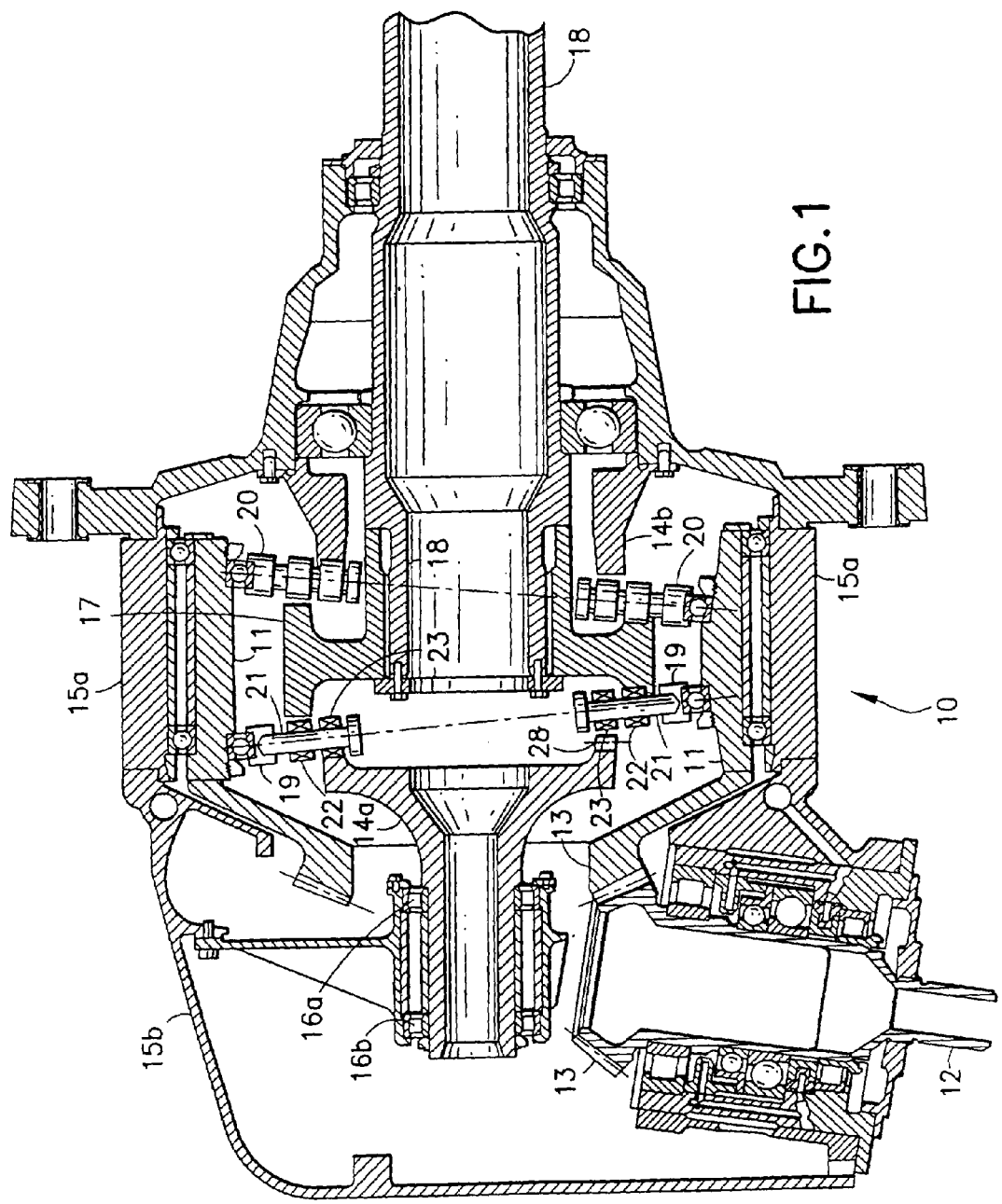
FIG. 1 is a side elevation view, in section, of one embodiment of the continuously variable power transmission of the present invention.
Figure 2:
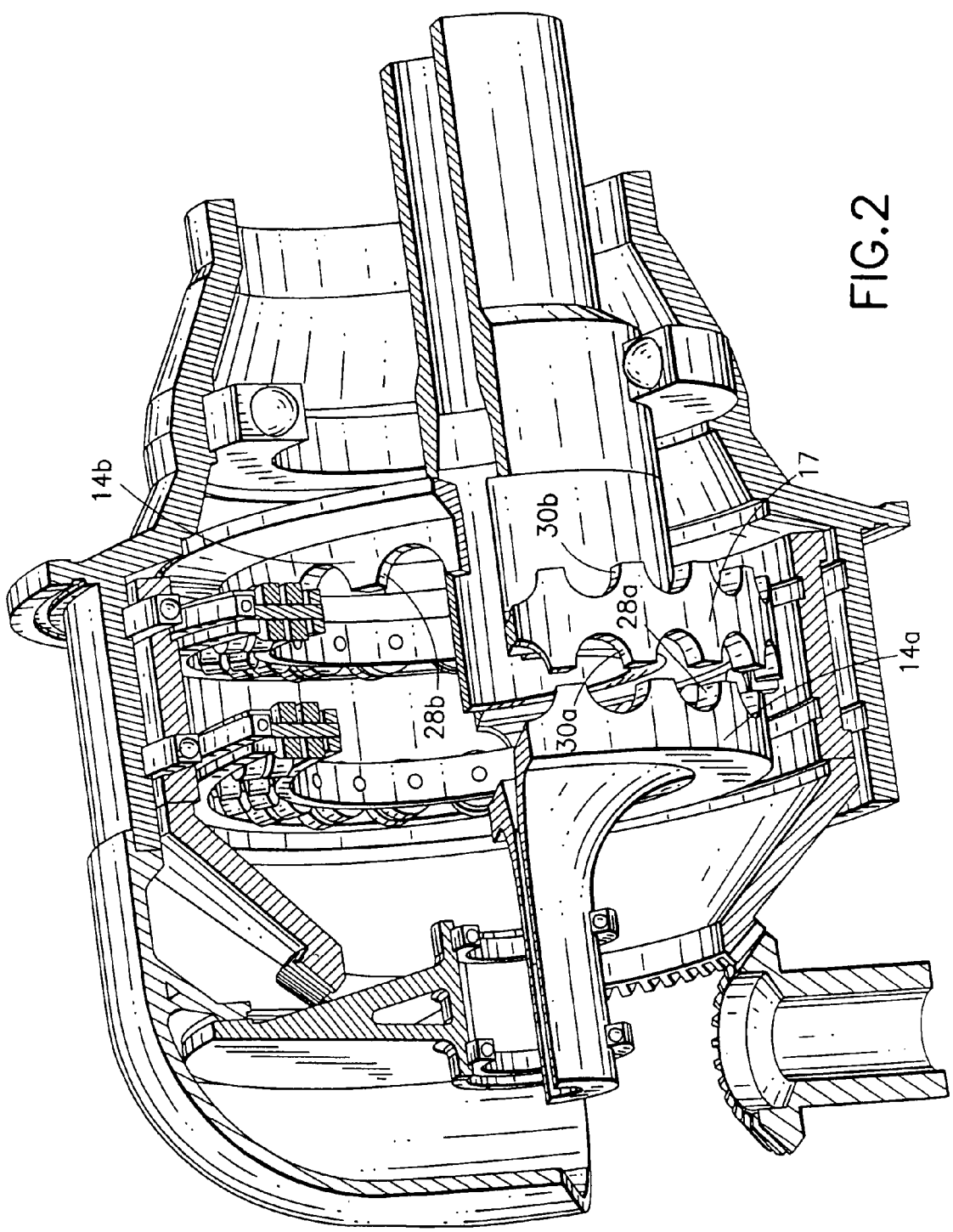
FIG. 2 is a perspective view, largely cut away and in section, illustrating the internal components of the power transmission illustrated in FIG. 1.
Figure 3:
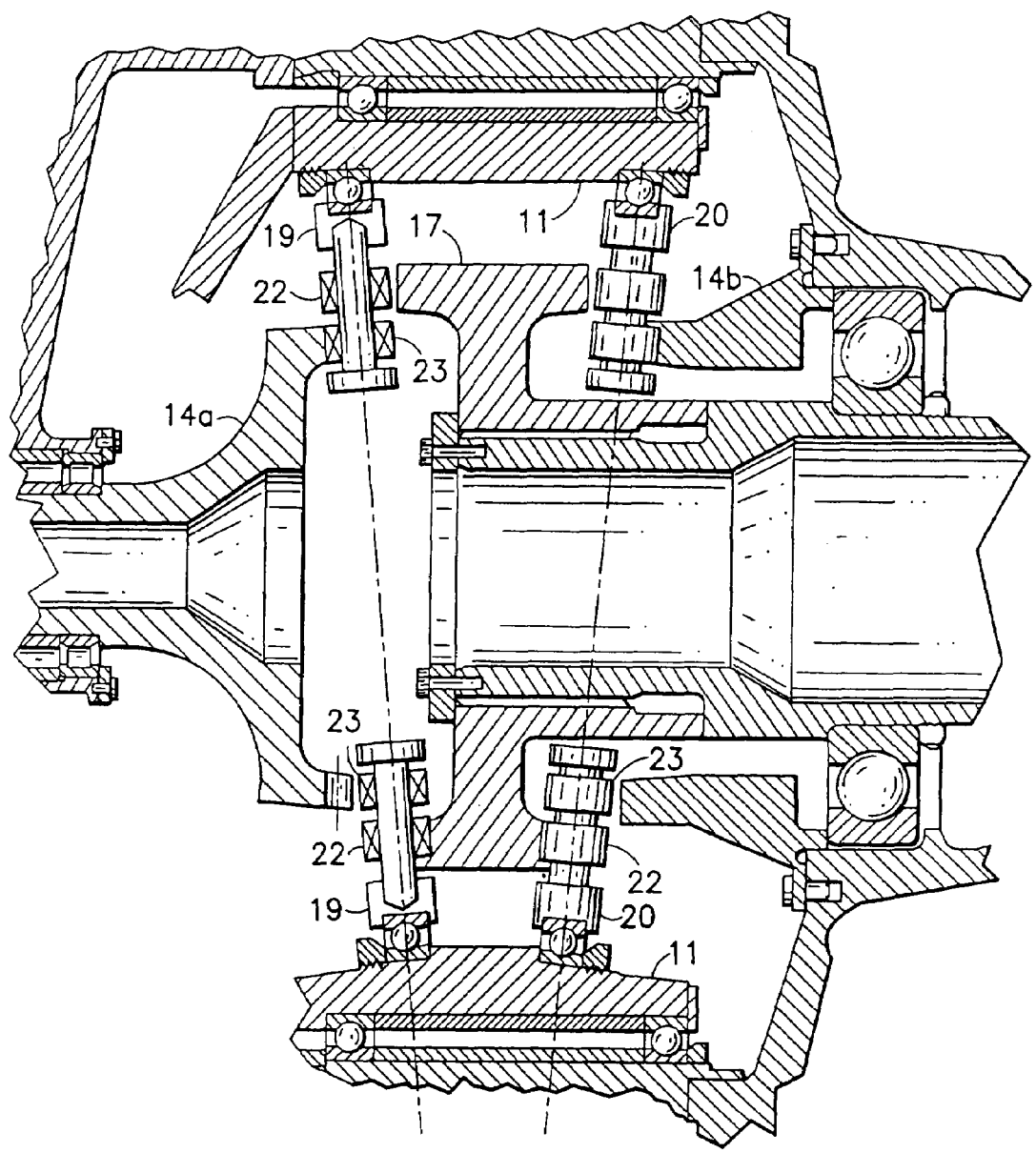
FIG. 3 is a side elevation view, in section, similar to FIG. 1, but illustrating this embodiment of the invention in greater detail, specifically showing multi-roller contacts occurring simultaneously at diametrically opposite quadrants of the invention.

Referring now to FIGS. 1, 2, and 3, there is shown by means of cross sectional views, one embodiment 10 of a variable power transmission incorporating features of the present invention. Although the variable power transmission concept of the invention will be described with reference to the embodiments shown in the drawings, it should be understood that the present invention can be embodied in many alternate forms or embodiments. In addition, any suitable size, shape or type of elements or materials could be used The variable speed power transmission 10 includes a rotatable split power pericyclic motion converter retaining ring member 11 journaled to the upper housing 15a that is attached to an input drive shaft 12 of a prime mover (not shown), via a bevel gear set 13 or face gear set (not shown), a rotatable coaxial reaction control rotor 14a rotably connected to the lower stationary housing 15b via a pair of rolling element bearings 16a and 16b, a coaxial driving member 17 connected to the output shaft 18, and a stationary coaxial reaction member 14b connected to a stationary cover 15c. The pericyclic retaining ring member 11 embodies a set of two journaled concentric ring assemblies 19 and 20 with inner and outer rings separated by spoke pins 21 equally spaced such that each embodies an outer roller 22 and an inner roller 23. These two sets of pericyclic motion converter ring assemblies 19 and 20 that incorporate equally spaced spoke type pins 21 with outer rollers 22 and inner rollers 23, are journaled to the pericyclic motion converter retaining ring member 11 at a calculated design coning angle to achieve pericyclic motion.

In high load capacity and higher speed drive train systems, "split power" transmissions are typically designed to facilitate increased power density by providing a dual torque/load path from a prime mover to the output member (usually an output shaft) that drives the final system unit. Such a design is dimensionally more compact than conventional designs. The split power design configuration also provides an additional benefit to nutational types of transmissions by eliminating a pair of counter weights that would be necessary to eliminate dynamic imbalance caused by the nutational motion of the pericyclic motion converter due to its mounting arrangement, that is, at a design coning angle to the input shaft center line. Although the pericyclic motion converter is statically balanced, dynamic thrust forces develop due to moment loads created by the pericyclic motion. However, the split power design overcomes the dynamic imbalance via thrust force cancellation.

The two reaction members 14a and 14b are designed as circular faceplates that incorporate equally spaced individual conjugate convoluted type roller raceways 28a and 28b around their periphery to facilitate the reaction of contact forces during each pericyclic path of action of the two pericyclic motion converter ring assemblies 19 and 20. The driving member 17 is also designed as a circular faceplate with individual conjugate convoluted type roller raceways 30a and 30b (FIG. 2) around its periphery to achieve torque transmission at variable design speeds of the output shaft 18. The unique individual convoluted and enveloping conjugate roller raceways cams 28a and 28b and 30a and 30b, respectively, around the periphery of the reaction members 14a and 14b and the dual face cam driving member 17 are designed to kinematically and dynamically take advantage of the inherent high load capacity and efficiency of high precision rolling element bearings.

The flexible component arrangements of the present invention make it feasible to infinitely vary its speed ratio capability and make a selection of different individual speed ratios with the same components. This capability is made possible by changing the effective difference in angular raceway spacing (or angular positioning) between the driving and reaction members 17 and 14a and 14b via an electronic controller. The operation of the variable speed power transmission 10 is as follows: the input drive shaft 12 rotates the pericyclic motion converter retaining ring member 11 via a bevel gear set 13 to permit pericyclic motion of the two pericyclic motion converter ring assemblies 19 and 20 via roller-raceway engagement with reaction control rotor members 14a and 14b and simultaneous roller-raceway engagement with the output driving rotor member raceways 17 resulting in the conversion of pericyclic type motion to rotary motion of the output shaft 18. Different speed ratios at the output shaft 18 can be achieved by adjusting the rotational speed of the reaction control rotor member 14a.

It is envisioned that the two motion converter unit arrangement in the pericyclic member 11 could be replaced by a single motion converter unit arrangement. It is envisioned that the principles of this invention can be employed in many devices, namely having an input member, a reaction control rotor member driven by a pericyclic motion converter member, driven by the input member and an output rotor member driven by the pericyclic motion converter member, in which the rotation speed of the reaction control member and /or the pericyclic member can be controlled independent of the input member; thereby, allowing the speed reduction/increase at the output rotor member to vary. It is also envisioned that the output rotor member can rotate in a direction opposite of the input member and that the output rotor member can be placed in a coasting or neutral position so that there is not translation of energy from the input member.

Consider now the kinematics of the variable speed power transmission concept of the present invention. The split power pericyclic assembly 11 embodies a set of two journaled concentric ring units 19, 20 separated by a selected number of equally spaced spoke type pins 21 that each journal an outer roller 22 and inner roller 23. The two ring units 19, 20 are journaled to the rotatable pericyclic ring member 11 at a calculated design coning angle to facilitate pericyclic type motion of ring units 19, 20. The reaction member 14a, which is journaled to the housings, is designed as a circular face plate that incorporates a selected number of equally spaced conjugate convoluted roller raceways 28a around its periphery to facilitate the reaction of contact forces during each pericyclic path of action. The output driving rotor member 17 which is connected to the output shaft 18 is designed as a double circular faceplate with back to back convoluted type roller raceways 30a, 30b around its periphery to provide rotary torque transmission at design speeds of the output shaft 18. The stationary reaction member 14b which is attached to the housing is also designed as a circular face plate that incorporates a selected number of equally spaced conjugate convoluted roller raceways 28b around its periphery to facilitate the reaction of contact forces during each pericyclic path of action.

Rotation of the input shaft 12 causes oscillatory or wobble type motion of the journaled pericyclic ring units 19, 20 that embody outer rollers 22 and inner rollers 23. The pericyclic ring unit rollers simultaneously engage a full quadrant of the reaction members 14a, 14b and a full quadrant of the output driving rotor member 17. More specifically, the inner rollers 23 engage the reaction member 14a and the outer rollers 22 engage the output driving rotor 17. In this manner, the transmitted load is shared by fifty percent (two quadrants) of the rollers and the conjugate convoluted roller raceways 28a, 30a and 28b, 30b respectively as shown in FIG. 2. As a result of the unusual kinematic/kinetic features of the pericyclic, the rotation of the input shaft 12 relative to the reaction members 14a, 14b causes a differential motion of the output driving rotor member, thereby permitting controlled variable speed without any significant power loss.

The geometry of the conjugate convoluted roller raceways 28a, 28b and 30a, 30b (FIG. 2) is determined from the path of motion of a fixed point on the pericyclic ring units as the input shaft rotates the journaled split power pericyclic assembly member 11 and the rollers 22 and 23 engage the reaction members 14a, 14b thereby driving the output driving rotor member 17. One 360 degree rotation of the input shaft 12 results in one complete spherical pericyclic path of action. The following kinematic treatment determines the angular velocities of the input shaft 12 and the pericyclic ring units and ultimately defines the conjugate convoluted roller raceways of the reaction members and the output driving rotor member 17.

Figure 4:
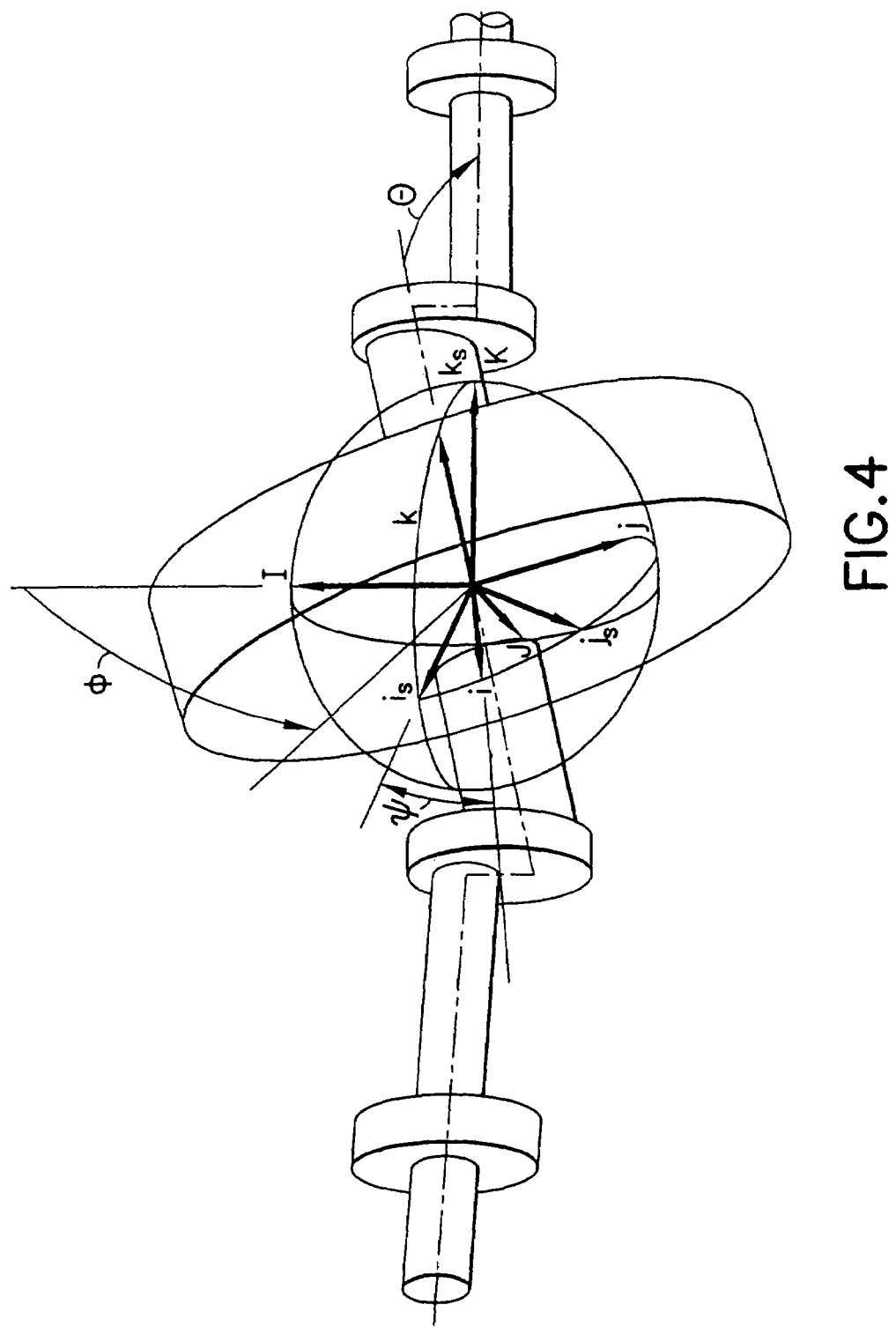
FIG. 4 is a diagrammatic view of a model for deriving pertinent information relating to the pericyclic unit.

Three sets of right-handed orthogonal unit triads are shown in FIG. 4. FIG. 4 is a diagrammatic representation of a model for deriving the angular velocity of the pericyclic and its position as a function of input shaft rotation to establish the path of a fixed point in the pericyclic which defines the spherical path along which it moves during one raceway traverse on the reaction member. The coordinates for machining the reaction and output rotor face cams are also established from this model.

The triad ($\vec{I},\vec{J},\vec{K}$) is fixed in space and denotes the inertial frame while the triads ($\vec{i}_s, \vec{j}_s, \vec{k}_s$) and ($\vec{i},\vec{j},\vec{k}$) are respectively fixed in the input shaft and pericycler. Transformation from one set of coordinates to the other is accomplished by defining the three conventional Euler angles ($\phi,\theta,\psi$) [2]. The resulting orthogonal transformation matrix is:

$$[E(\phi,\theta,\psi)] = \begin{bmatrix} -\sin\phi\sin\psi & \cos\phi\sin\psi & -\sin\theta\cos\psi \\ +\cos\theta\cos\phi\cos\psi & +\cos\theta\sin\phi\cos\psi & \\ -\sin\phi\cos\psi & \cos\theta\cos\psi & \sin\theta\sin\psi \\ -\cos\theta\cos\phi\sin\psi & -\cos\theta\sin\phi\sin\psi & \\ \sin\theta\cos\phi & \sin\theta\sin\phi & \cos\theta \end{bmatrix} \quad (1)$$

and the relevant transformation is $$\vec{r} = [E(\phi,\theta,\psi)]\vec{R} \quad (2)$$

where $\vec{R}$ is the vector in the fixed frame ($\vec{I},\vec{J},\vec{K}$) and $\vec{r}$ denotes the components in the moving system ($\vec{i},\vec{j},\vec{k}$).

In order to determine the path of a point fixed in the pericycler it is necessary to define angular velocity of the pericycler and represent this velocity in terms of $\phi,\theta,\psi$, and their derivatives. Finally, the resulting equations may be integrated to obtain the pericycler position as a function of input shaft rotation. If the ratio of the number of convoluted raceways on the reaction members to the number of rollers on the pericycler is $\lambda$, then the angular velocity of the pericycler relative to the shaft in the shaft frame is clearly $$\vec{\omega}_{ns}^s = \lambda \omega_{reac.} \vec{k}_s \sim$$

where $\omega_{reac.}$ is the angular velocity of the reaction members with respect to the shaft. When the reaction members are stationary and the shaft has an absolute angular velocity $\vec{\omega}_s \vec{K}$, then $$\vec{\omega}_{ns}^s = -\lambda \omega_s \vec{k}_s \quad (3)$$

Since the shaft frame is located by shaft rotation $\alpha$ and the pericycler angle $\gamma$, the above may be transformed in the inertial frame with $\phi=\alpha$, $\theta=\gamma$, $\psi=0$.

$$\begin{aligned}\vec{\omega}_{ns} &= [E(\alpha,\gamma,0)]^T \vec{\omega}_{ns}^s \\ &= -\omega_s\lambda\sin\gamma\cos\alpha\vec{I} - \omega_s\lambda\sin\gamma\sin\alpha\vec{J} - \omega_s\lambda\cos\gamma\vec{K}\end{aligned} \quad (4)$$

The absolute pericycler and shaft velocities are thus respectively written as $$\vec{\omega} = -\omega_s\lambda\sin\gamma\cos\alpha\vec{I} - \omega_s\lambda\sin\gamma\sin\alpha\vec{J} + \omega_s(1-\lambda\cos\gamma)\vec{K} \quad (5)$$

$$\omega_s = \omega_s \vec{K}$$

In terms of $\phi,\theta,\psi$ the angular velocity of the pericycler is expressed as $$\vec{\omega}_N = \dot\phi\vec{K} + \dot\theta\vec{j}_s + \dot\psi\vec{k} \quad (6)$$

where "." denotes the time derivatives and the unit vectors $\vec{j}_s$ and $\vec{k}$ are expressible in terms of ($\vec{I},\vec{J},\vec{K}$) and ($\phi,\theta,\psi$) as shown in FIG. 4. Some algebraic manipulation results in $$\begin{Bmatrix}\dot\phi \\ \dot\theta \\ \dot\psi\end{Bmatrix} = \begin{bmatrix}-\cos\phi\cot\theta & -\sin\phi\cot\theta & 1 \\ -\sin\phi & \cos\phi & 0 \\ \cos\phi\cos ec\theta & \sin\phi\cos ec\theta & 0\end{bmatrix}\begin{Bmatrix}\omega_{n_1} \\ \omega_{n_2} \\ \omega_{n_3}\end{Bmatrix} \quad (7)$$

where the notation $\vec{\omega}_n = \omega_{n_1}\vec{I} + \omega_{n_2}\vec{J} + \omega_{n_3}\vec{K}$ is used, If the shaft angular velocity $\omega_s\vec{K}$ is a constant, then Equations (5) and (7) may be combined to give the final expressions for $\dot\phi,\dot\theta,\dot\psi$ in terms of shaft rotation $\alpha$.

$$\frac{d\phi}{d\alpha} = \lambda\sin\gamma\cot\theta\cos(\alpha-\phi) - \lambda\cos\gamma + 1 \quad (8)$$

$$\frac{d\theta}{d\alpha} = -\lambda\sin\gamma\sin(\alpha-\phi)$$

$$\frac{d\psi}{d\alpha} = -\lambda\sin\gamma\cos ec\theta\cos(\alpha-\phi)$$

In general these equations may be integrated with the initial conditions $\alpha=0 \rightarrow \phi=0$, $\theta=\gamma$, $\psi=0$. However, since $\vec{\omega}_{ns}^s$ is along the unit vector $\vec{k}_3$ the pericycler vector $\vec{k}$ is fixed also in the shaft, which means that $\theta=\gamma$, a constant, i.e., $d\theta/d\alpha=0$. A substitution of these conditions in Equation (8) gives $$\phi = \alpha \quad (9)$$

-continued
$$\theta = \gamma$$
$$\psi = -\lambda\alpha$$

As an application of the above analysis, let the point on the pericycler, under condition, have a position vector $\vec{r}$ in the pericycler frame $$\vec{r} = \cos\beta\,\vec{i} - \sin\beta\,\vec{k}, \beta \text{ being a coning angle.}$$

It is clear that such a point will move on a sphere of unit radius and will be located by a position vector $\vec{R}$ in the inertial frame by the equation $$\vec{R} = [E(\alpha,\gamma,-\lambda\alpha)]^T\vec{r} \qquad (10)$$

The components of $\vec{R} = R_1\vec{I} + R_2\vec{J} + R_3\vec{K}$ may be transformed into conventional longitudes and latitudes denoted respectively as $$\xi = -\tan^{-1}\left(\frac{R_2}{R_1}\right)$$

$$\eta = \tan^{-1}\left(\frac{R_3}{\sqrt{R_1^2 + R_2^2}}\right)$$

Figure 5:
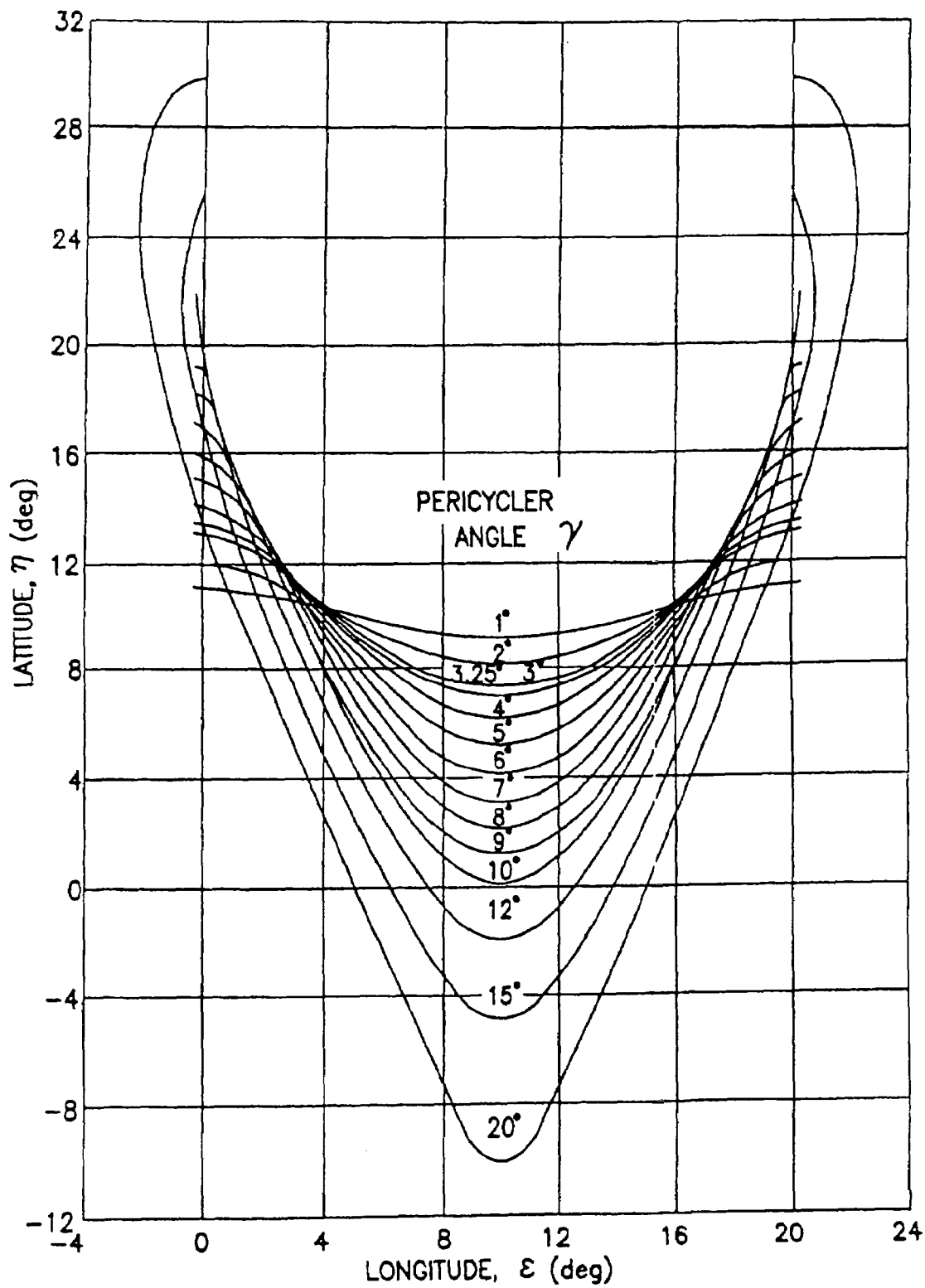
FIG. 5 is a graph depicting the path along which the center of a follower member of a pericyclic motion converter moves during a one revolution traverse while in engagement with the reaction control rotor as plotted for a plurality of values of pericyclic angle gamma.

For $\beta=10°$ and $\lambda=18/19$, i.e., 18 raceways on the reaction members meshing with 19 rollers on the pericycler, $\xi$ and $\eta$ are plotted for various values of pericycler angle $\gamma$ in FIG. 5. These profiles actually denote the path along which the center of a roller will move during one raceway traverse on the reaction members.

Figure 6:
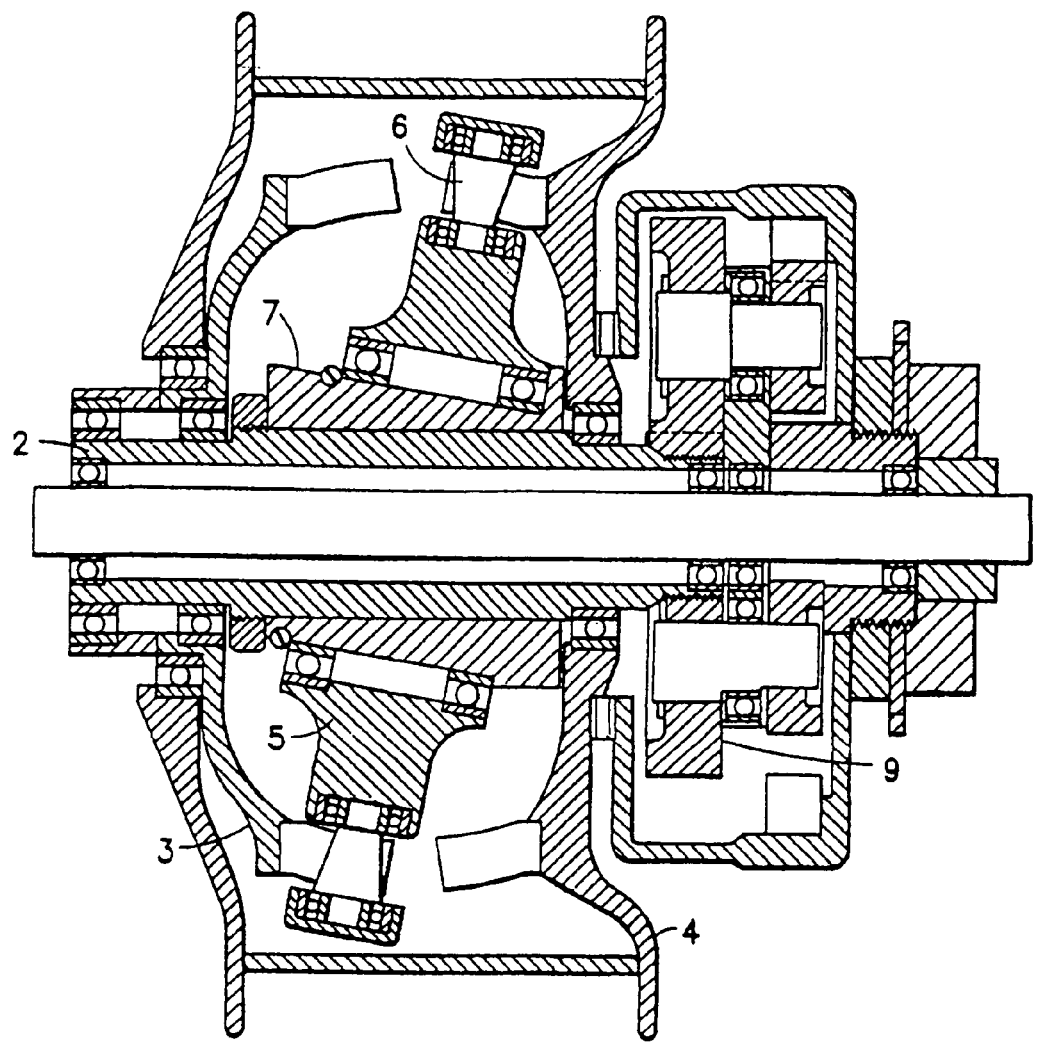
FIG. 6 is a cross sectional view in elevation of a prototype design of the present invention that is typical for mounting in a wheel hub of a vehicle.

A prototype design of the present invention, as seen in FIG. 6 has been fabricated and tested to verify its capability to function as a stepless variable speed transmission. This prototype PVT (Pericyclic Varydrive Transmission) is an example of its application to human powered vehicles including bicycles, scooters, wheel chairs, carts, etc. and for power-assisted human powered vehicles utilizing electric motors and control electronics to augment the user's effort. This prototype PVT can be mounted inside the hub of a bicycle rear wheel to facilitate stepless speed changes over a ratio range of about 0.535 to about 4.457. With such a construction, the PVT will likely eliminate the state-of-the-art derailleur/multi-sprocket system that permits only a relatively few step ratio speed changes.

The prototype PVT comprises a pericyclic member 5 journaled to the input shaft 2 at a designed angle 7 to permit oscillatory motion and thereby continuous torque transmitting engagement with a journaled reaction member 3 and simultaneously with an output driving member 4. For the bicycle application, the input speed is augmented, that is, increased, by a planetary gear set 9 having, for example, a 6:1 ratio. The pericycler member embodies a set of equally spaced rollers 6 that mesh with the convoluted type raceways of the reaction member 3 and the output driving member 4.

The output speed of the PVT can be varied by changing the reaction member 3 rotational speed with respect to the input shaft rpm. Maximum output speed is designed to decrease proportionately with increasing reaction member speed. The reaction member is counter rotating, that is, its rotation is in the opposite direction with respect to the input rotation.

To facilitate application in which the designs require "low speed ratio ranges such as 0.5:1 to 5.6:1 which is typical for bicycles, an augmentation member is used to increase the basic input ratio to approximately 10:1. This provides an efficient rate of rotation of the reaction control rotor relative to the input member for a design variable speed output range of 0.5:1 to 5.6:1. The augmentation member can be a planetary gear or other in-line mechanical gear member.

The PVT design features that influence the output speed are as follows:

| | |
|---|---|
| Number of reaction member raceways, Nrm | 8 |
| Number of output driving member raceways, Nom | 10 |
| Number of pericyclic rollers, Npr | 8 |
| Planetary speed increase ratio, Rpl | 6:1 |

The reaction member speed ratio (Rpl) is defined as the ratio of reaction member speed rotation and the PVT input speed. The variable output speed ratio (V), (ratio of output speed to the input speed) is calculated by the following equations:

$$M = (\text{Nom} \times \text{Npr})/(\text{Nom} \times \text{Npr} - \text{Npr} \times \text{Nrm})$$

where M is the maximum PVT ratio of input to output with the reaction member fixed; and $$V = \text{Rpl} \times (1 + \text{Rrm} \times [M-1])/M.$$

Figure 7:
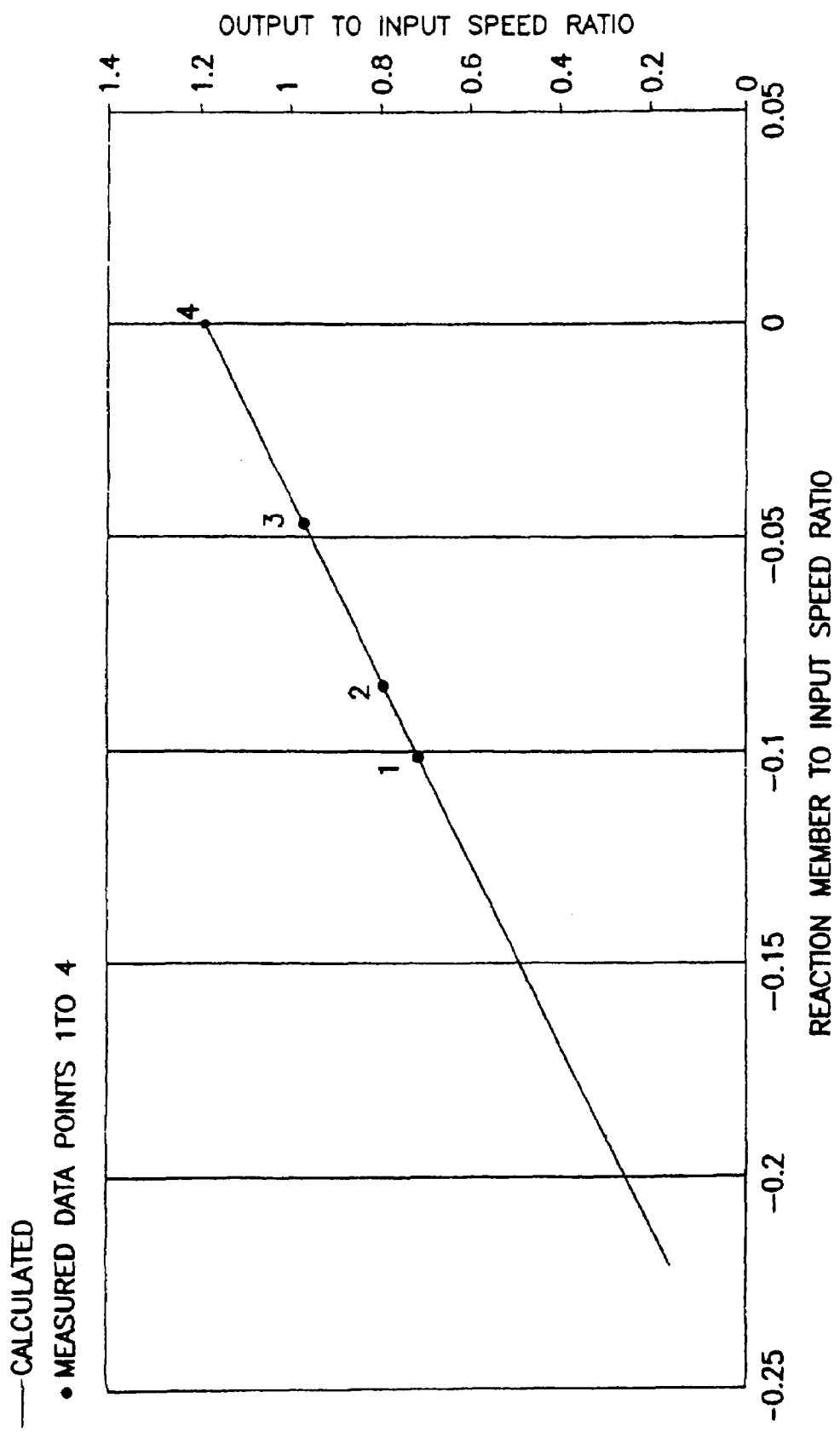
FIG. 7 is a graph of calculated, and four measured data points, of the output speed ratio V as a function of the reaction member speed ratio $R_{rm}$.

FIG. 7 is a graph of calculated output speed ratio V as a function of the reaction member speed ratio Rrm, and shows the linearly variable output speed capability of the prototype PVT unit.

The variable output speed capability of the prototype PVT unit was verified by measuring the rotational speeds of the input shaft 2, reaction member 3 and the output driving member 4. The component member speeds were measured by timing each member for a selected number of rotations (that is, by measuring the time required for 30 revolutions of the input shaft 2, 10 revolutions of the reaction member 3 and 60 revolutions of the output driving member 4. The reaction member 3 speed was increased progressively from zero up to a maximum speed that could be visually counted. Thus, various component rotational speeds were measured for four separate speed settings of the reaction member 3. At each of these speed settings, three measurements were made to minimize potential errors. Table 1 summarizes the measured times in seconds and rotational speeds in rpm for the respective components. Table 1 also shows the speed ratios of the reaction member (Rrm) and the overall output ratios for the respective measurements.

Table 2 compares the calculated and measured output ratios as a function of the ratios Rrm for the reaction member 3. As shown in FIG. 7, the measured data corresponds very closely with the calculated values of the output ratios for the speed settings of the four reaction members 3 evaluated.

TABLE 1

Measured Times and Speeds of PVT Input Member, Reaction Member, and Output Member

| | Input Member Speed | | Reaction Member Speed | | | Output Member Speed | | |
|---|---|---|---|---|---|---|---|---|
| | 30 Rev. Time | RPM | 10 Rev. Time | RPM | $R_{RM}$ Ration | 60 Rev. Time | RPM | Output |
| I. | 15.39 | 116.959 | — | 0 | 0.000 | 25.48 | 141.287 | 1.208 |
| | 15.34 | 117.340 | — | 0 | 0.000 | 25.60 | 140.625 | 1.198 |
| | 15.35 | 116.883 | — | 0 | 0.000 | 25.55 | 140.900 | 1.205 |
| II. | 15.69 | 114.723 | 18.55 | −32.345 | −0.047 | 32.37 | 111.214 | 0.969 |
| | 15.70 | 114.650 | 18.46 | −32.503 | −0.047 | 32.04 | 112.360 | 0.980 |
| | 15.56 | 115.681 | 18.64 | −32.189 | −0.046 | 31.85 | 113.030 | 0.977 |
| III. | 15.30 | 117.647 | 10.02 | −59.880 | −0.085 | 38.45 | 93.62 | 0.796 |
| | 15.35 | 117.264 | 9.96 | −60.241 | −0.086 | 38.28 | 94.044 | 0.802 |
| | 15.33 | 117.417 | 10.01 | −59.940 | −0.085 | 38.26 | 94.093 | 0.801 |
| IV. | 15.47 | 116.354 | 8.72 | −68.807 | −0.099 | 42.98 | 83.760 | 0.720 |
| | 15.38 | 117.035 | 8.30 | −72.289 | −0.103 | 42.98 | 83.760 | 0.716 |
| | 15.44 | 116.580 | 8.54 | −70.258 | −0.100 | 42.69 | 84.329 | 0.723 |

TABLE 2

Average Speed Ratios

| | Reaction Member $R_{RM}$ Ratio | Output to Input Ratio Calculated | Measured |
|---|---|---|---|
| I. | 0.000 | 1.200 | 1.204 |
| II. | −0.047 | 0.974 | 0.976 |
| III. | −0.085 | 0.792 | 0.800 |
| IV. | −0.101 | 0.715 | 0.714 |

Notes
1. $R_{rm}$ Ratio is the ratio of reaction member speed to the input speed.
2. Output ratio is the ratio of output speed to the input speed.

In conclusion the variable stepless output speed capability of the prototype PVT unit was verified. The output speed ratio varies linearly with increasing ratio Rrm for a reaction member 3 from a maximum output speed for a stationary (Rrm=0) reaction member 3. The output speed decreases linearly.

Turn now to FIGS. 8–17 for the description of another embodiment of the invention. In this instance, beginning with FIGS. 8–10, a continuously variable speed power transmission 200 includes an input member 202 in the form of longitudinally extending drive shaft 204 rotatable about an input axis 206. An output member 208 includes a longitudinally extending driven shaft 210 and an integral output disk 212 lying generally in a plane perpendicular to an output axis 214 about which driven shaft 210 rotates. The output disk 212 includes a solid web 213 which is splined or otherwise fixed to the driven shaft 210 and extends between a hub 216 fixed on the driven shaft and an outer peripheral flange 218 lying in a plane parallel to the output axis containing a plurality of rearwardly directed output face cams 220.

Figure 8:
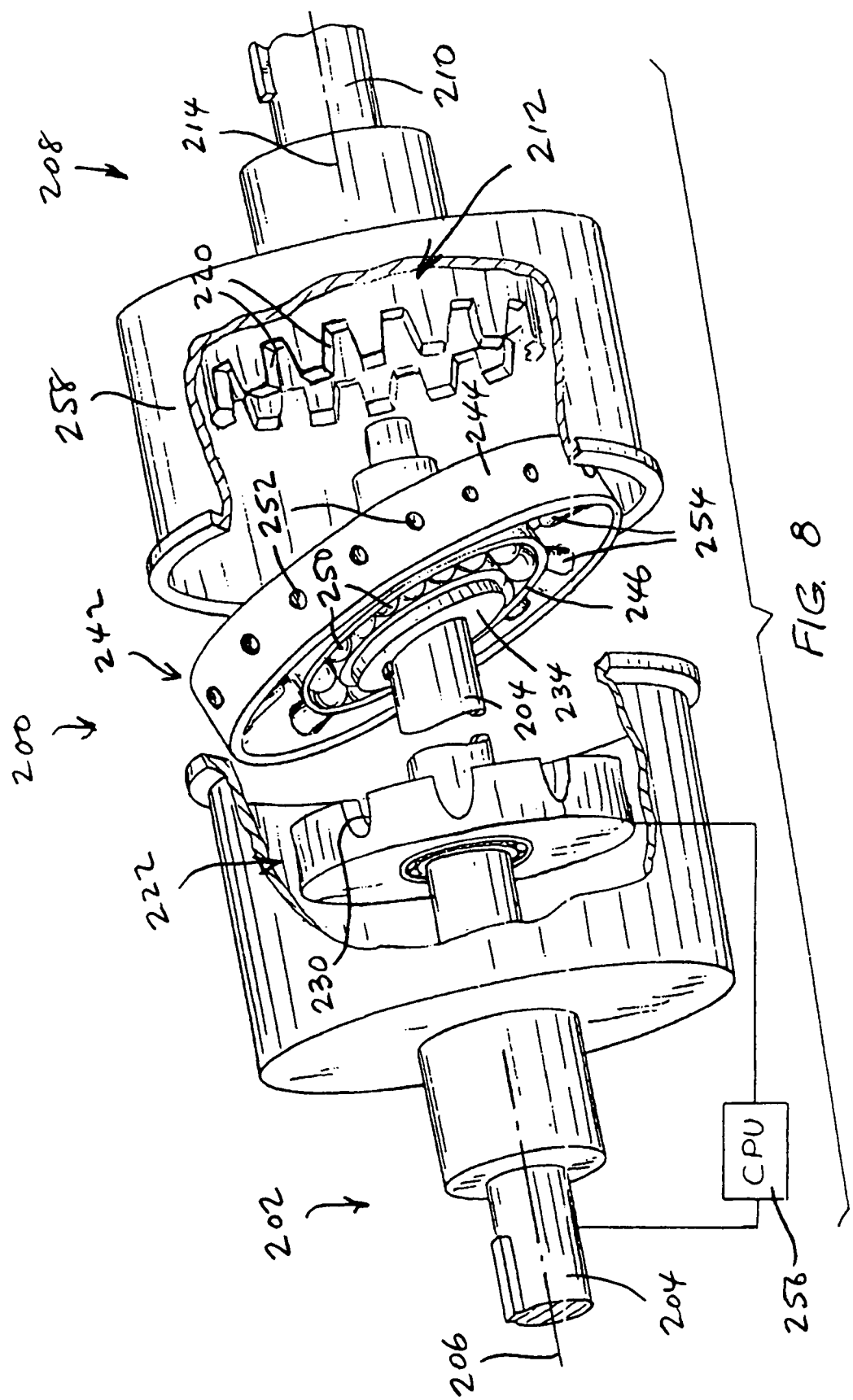
FIG. 8 is an exploded perspective view, partially cut away and shown in section, of another embodiment of the continuously variable power transmission of the present invention.
Figure 9:
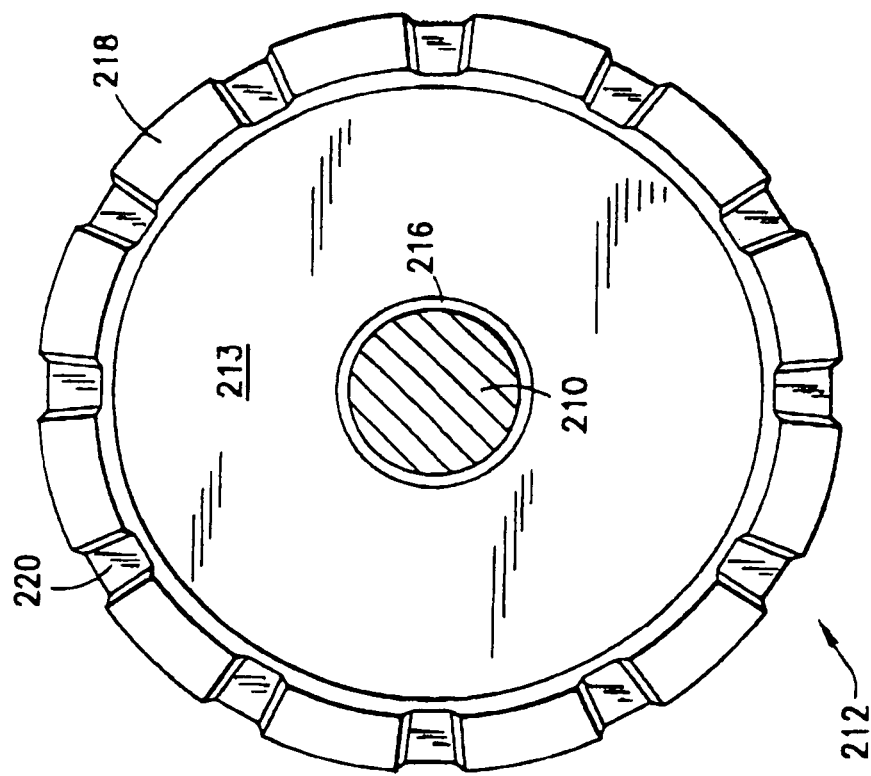
FIG. 9 is a detail elevation view illustrating an output rotor which is a component of the power transmission illustrated in FIG. 8.
Figure 10:
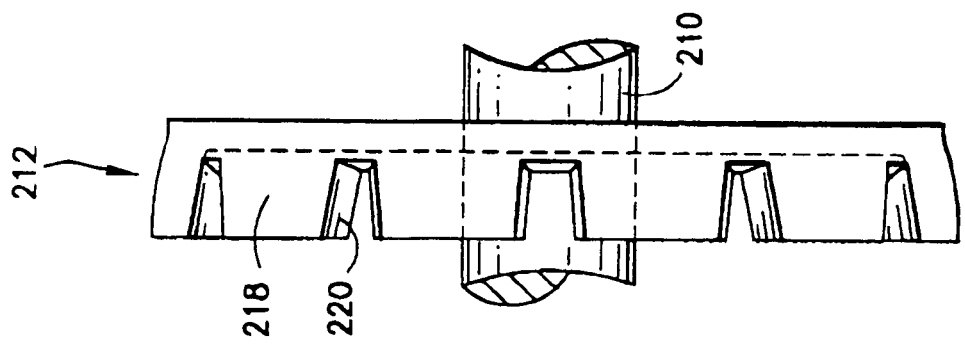
FIG. 10 is a detail side elevation view of the component illustrated in FIG. 9.
Figure 11:
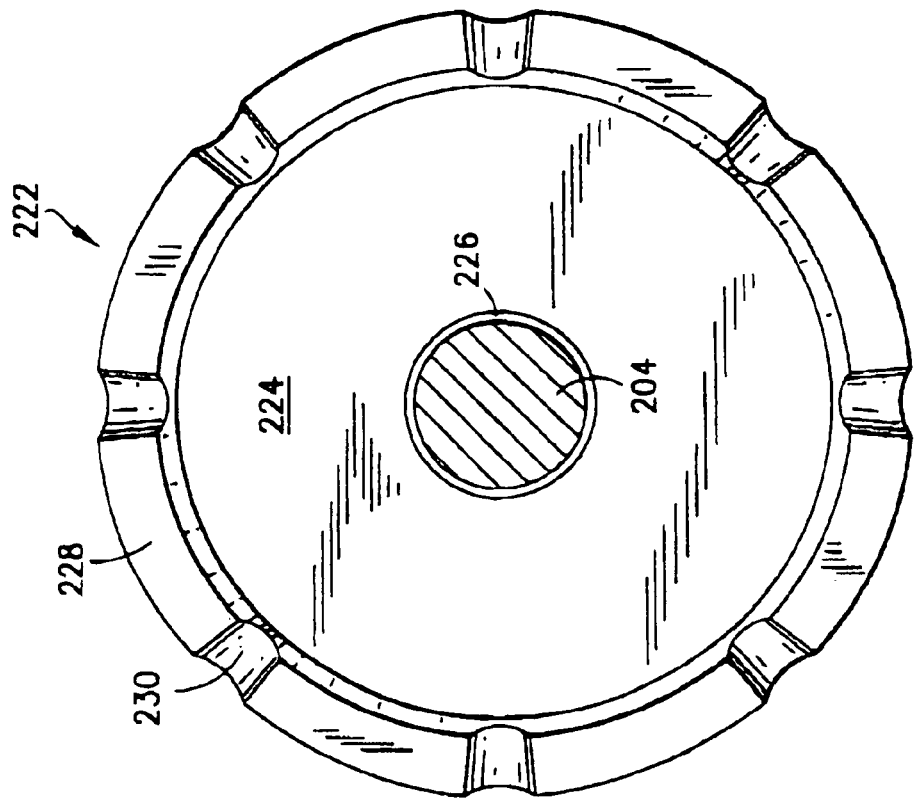
FIG. 11 is a detail elevation view illustrating a reaction control rotor which is a component of the power transmission illustrated in FIG. 8.
Figure 12:
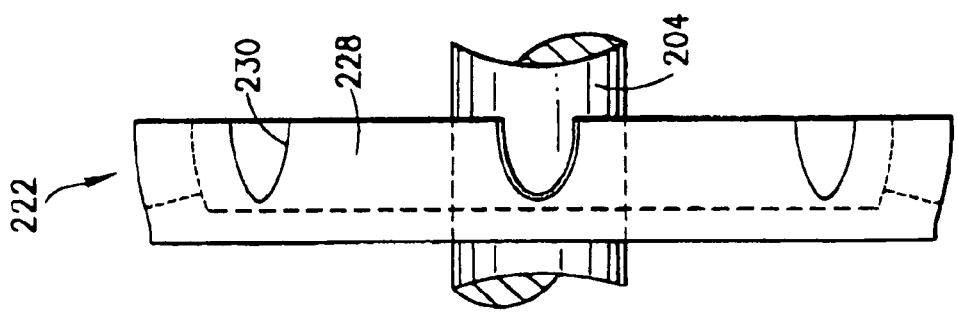
FIG. 12 is a detail side elevation view of the component illustrated in FIG. 11.

Viewing now FIGS. 8, 11, and 12, a reaction control rotor 222 is mounted for selective rotation about the input axis 206. The reaction control rotor 222 includes an input disk or web member 224 lying in a plane perpendicular to the input axis and extending between a hub 226 rotatably mounted on the drive shaft 204 and an outer peripheral flange 228 lying in a plane parallel to the input axis containing a plurality of forwardly directed reaction face cams 230 positioned in opposition to the output face cams 220 on the output member 208.

In a modified embodiment of the invention illustrated in FIGS. 13 and 14, a reaction control rotor 222a may include a hub 226a fixed on a driven shaft 204a, an outer peripheral flange 228a lying in a plane parallel to the output axis and containing a plurality of forwardly directed reaction face cams 230a, and a plurality of radially extending spokes 232 at circumferentially spaced locations extending between and integral with the hub 226a and with the outer peripheral flange. Although not illustrated, the output disk 212 may be similarly modified to include a plurality of radially directed spokes in place of the solid web member 213.

With continued reference to FIG. 8 and now turning also to FIG. 15, the input member 202 is seen to include the longitudinally extending drive shaft 204 and a canted cam member 234 fixed on the drive shaft as by a key member 236. The canted cam member 234 has a first bearing track 238 and a cam axis 240 coplanar with the input axis 206 but angularly disposed relative to the input axis. The power transmission 200 further includes a pericyclic motion converter 242 which itself includes a peripheral ring 244 coplanar and coaxial with the canted cam member 234 and an intermediate ring 246 coplanar and coaxial with the canted cam member and having a second bearing track 248 spaced from and opposed to the first bearing track. In a customary fashion, bearing elements 250 are suitably received between and are engaged with the first and second bearing tracks 238, 248 enabling rotation of the intermediate ring about the canted cam member.

A plurality of radially extending follower pins 252 are fixed at circumferentially spaced locations extending between and integral with the peripheral ring 244 and with the intermediate ring 246 and a load transmitting follower member 254 such as a roller is rotatably mounted on each of the follower pins. As clearly seen in FIG. 15, a plurality of the load transmitting follower members 254 simultaneously engage at diametrically opposite locations with the output face cams 220 and with the reaction face cams 230.

Suitable control apparatus in the form of an electronic controller 256 is an integral and necessary part of the invention and serves to selectively adjust the rate of rotation of the reaction control rotor 222 relative to the input member or drive shaft 204. The reaction control rotor may, for example, be under the control of any suitable electronic controller such as a computer, CPU or the like. In one instance, the reaction control rotor 222 may be lock to the housing for unitary rotation with the drive shaft and in other instances may rotate through a desired range of rates of rotation relative to the input shaft. In those instances in which relative rotation occurs between the reaction control rotor 222 and the drive shaft 204, pericyclic motion of the pericyclic motion converter 242 result about the input axis 206 and thereby cause a change of ratio of the rotational speed of the output rotor member 212 relative to the input member 202.

In the instance of the power transmission 200, a housing 258 may be suitably mounted on the input member 202 and on the output member 208 and encompass the mechanism describe for its protection, but, unlike the instance of the embodiment FIGS. 1–3, no interaction occurs between the housing 258 and the assembly comprising the reaction control rotor 222, the output rotor 212 and the pericyclic motion converter 242.

Yet another embodiment of the invention can be seen with respect to FIGS. 16 and 17 which are generally similar to the construction of FIGS. 14 and 15. In this instance, similar components are similarly numbered but modified by use of the suffix "a". The modified variable speed transmission 200*a* differs from transmission 200 primarily in the provision of a pericyclic motion converter 242*a* which is of a moderately different construction than the pericyclic motion converter 242. More specifically, the pericyclic motion converter 242*a* includes a peripheral ring 244*a* coplanar and coaxial with the canted cam member 234*a* and an intermediate ring 246*a* coplanar and coaxial with the canted cam member. As in the earlier described embodiment, bearing elements 250*a* between and engaged with first and second bearing tracks 238*a*, 248*a* enable rotation of the intermediate ring about the canted cam member.

A first plurality of radially extending rearward follower pins 252*a* at circumferentially spaced locations extend between and are integral with the peripheral ring 244*a* and with the intermediate ring 246*a*, a load transmitting follower member 254*a* being rotatably mounted on each of the rearward follower pins. In a similar fashion, a second plurality of radially extending forward follower pins 252*b* at circumferentially spaced locations extend between and are integral with the peripheral ring 244*a* and with the intermediate ring 246*a*, a load transmitting follower member 254*b* being rotatably mounted on each of the forward follower pins 252*b*. The first plurality of rearward follower pins 252*a* and the second plurality of forward follower pins 252*b* lie, respectively, in spaced apart parallel planes. As clearly seen in FIG. 17, at any one time, a plurality of the load transmitting follower members 254*a* engage a number of the reaction rotor face cams 230*a* along an arcuate reach of the reaction control rotor 222*a* even as a plurality of the load transmitting follower members 254*b* engage a number of the output rotor face cams 220*a* along an arcuate reach of the output rotor member 212*a* at diametrically opposite locations of the pericyclic motion converter 242. In this manner, one set of the load transmitting follower members always rotate in one direction while the adjoining set always rotate in the opposite direction. Thus, the construction of FIGS. 16 and 17 avoids the shortcoming of the construction of FIGS. 14 and 15 which requires the follower members 254 to instantaneously change direction as they move out of engagement with the reaction control rotor face cams 230 and into engagement with the output rotor face cams 220, and vice versa.

Figure 18:
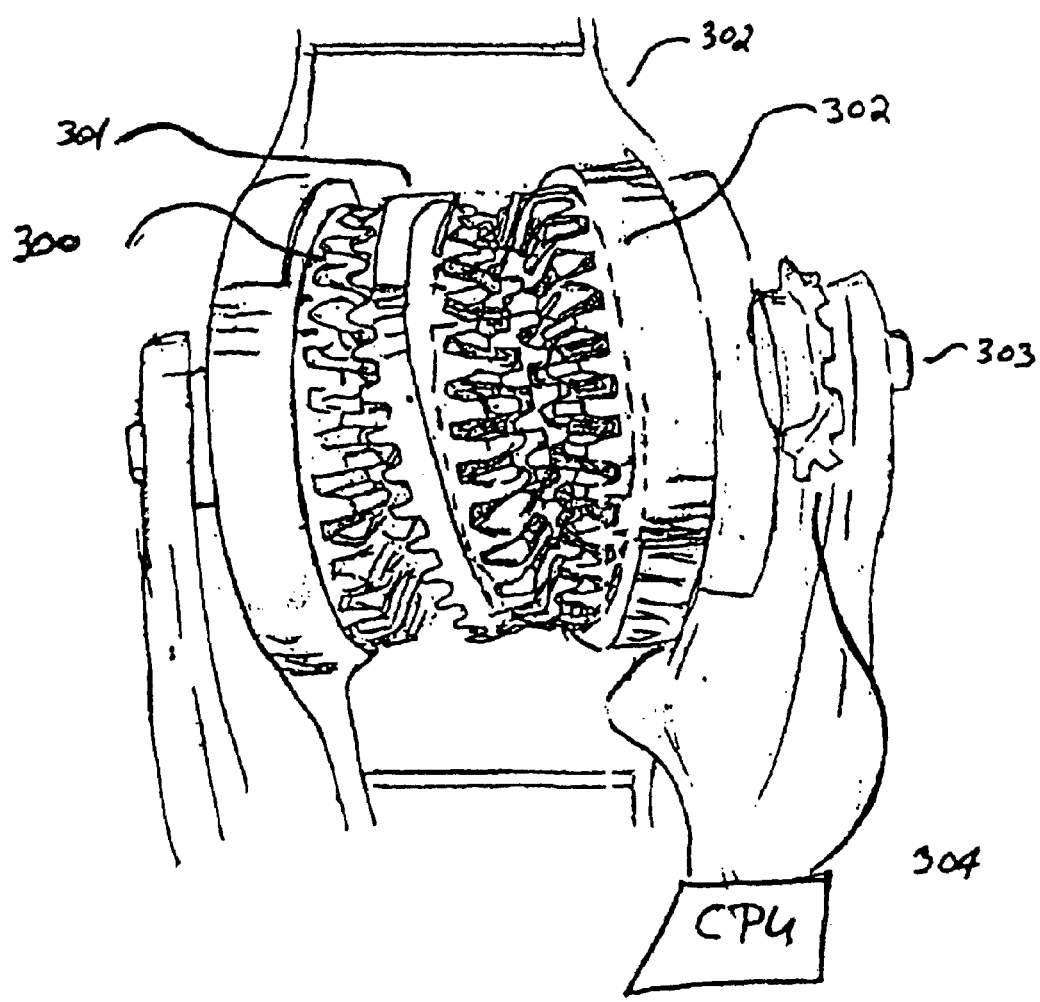
FIG. 18 is an exploded perspective view, partially cut away and shown in section, of an embodiment of the continuously variable power transmission of the present invention in a wheel hub of a vehicle.

Another embodiment of the invention is shown in FIG. 18 which is shown for purposes of illustration in a vehicle wheel hub. This embodiment of the continuously variable power transmission may conveniently be employed in a large variety of vehicles. An electronic controller is attached to the input shaft 303 and the output rotor member 302 as discussed above with other embodiments of the present invention. A pericyclic motion converter, preferably a conjugate pericyclic motion converter, 301, is similar in function to pericyclic motion converters of other embodiments of the present invention discussed above.

A continuously variable speed power transmission system can embody conjugate external and internal face and bevel type gear teeth in place of reaction and output rotor face cams and motion converter rollers. A preferred embodiment of this type is shown in FIG. 18. This embodiment substantially simplifies the design and reduces manufacturing costs for assisted power vehicles and lower speed operating drives. It may also be used for high power vehicles and high speed operating drives. The power density of a bevel gear embodiment is expected to be equivalent to that of the cam/roller embodiment of the pericyclic transmission of the invention. The efficiency of the bevel gear embodiment is expected to be somewhat less than the cam/roller embodiment due to a small component of sliding during load transfer. However, the sliding component the pericyclic bevel gear system is substantially less than state-of-the-art bevel gear transmission systems.

Figure 19:
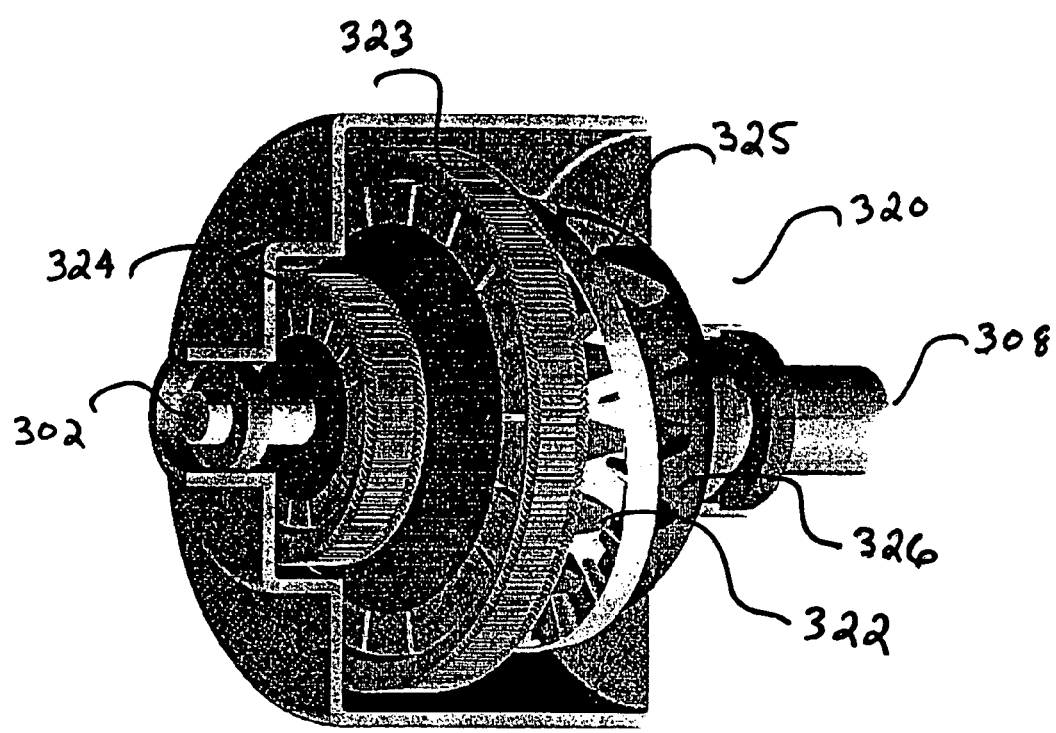
FIG. 19 is an exploded perspective view, partially cut away and shown in section, of an electric motor/generator integrated and/or embodied with the continuously variable power transmission of the present invention.

Yet another embodiment of the invention is shown in FIG. 19. This integrate and/or embodied electromechanical pericyclic continuously variable transmission embodiment 320 has an input shaft 302, an output shaft 308, a reaction control rotor with face cams 322, a motion converter 325, DC speed control motor elements 324, an output rotor 326 and electric motor/generator elements 323.

The integrated and or embodies motors/generator components/elements, such as shown in FIG. 19, provide rotational (RPM) control means to the reaction control rotor to facilitate selected design ratio changes of the output rotor. The motors can also provide independent input power via battery pack in addition to power supplied from a prime mover. One or both motors can act as generators for braking purposes. Also, both motors can operate in the same direction of rotation (i.e., clockwise) in synchrony doubling the power. The holding of one of the motors steady allows the other motor to spin up, thereby controlling field current to the first motor; this will slow a vehicle and recharge the battery pack. A CPU/electronic contoller is used to monitor and control each motor's RPM for all-wheel drive and anti-lock braking. This arrangement provides torque multiplication, very large ratios, and direct drive to vehicle wheels at very high efficiency and power density.

Figure 20:
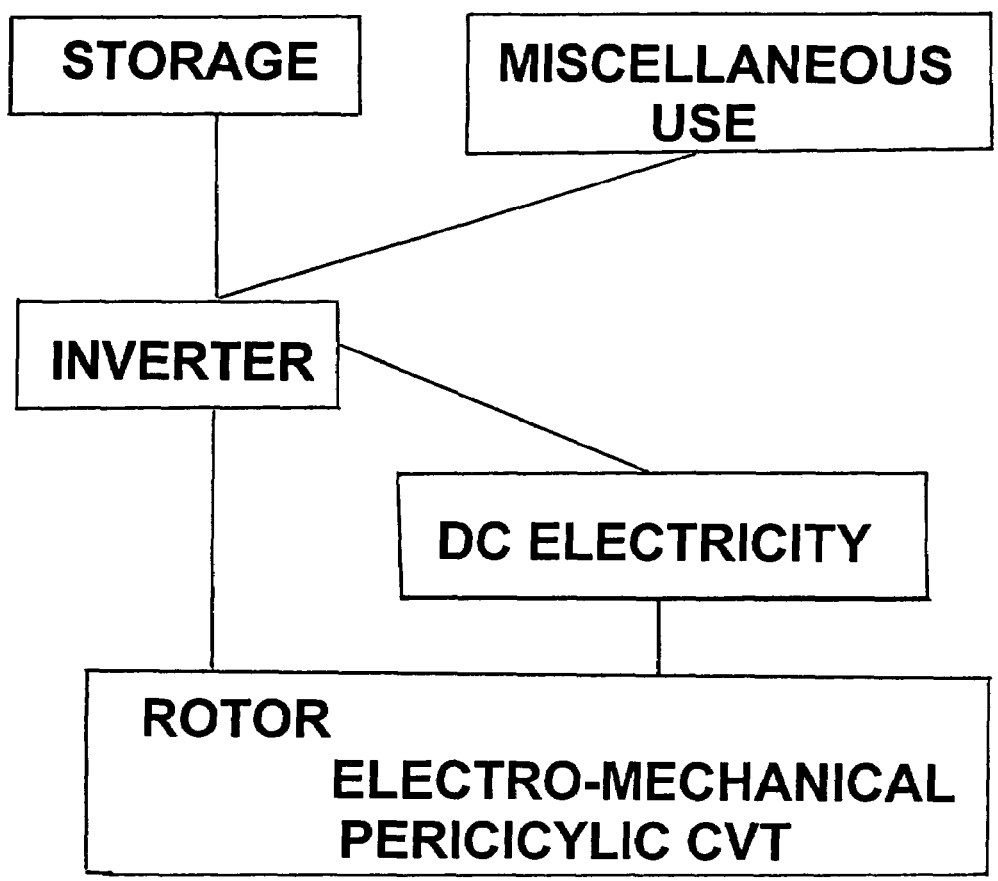
FIG. 20 is a graphic representation of several electricity usage patterns of an integrated and/or embodied electric motor/generator elements/components integrated with the continuously variable power transmission of the present invention

With reference to the diagram of FIG. 20, it is understood that the reaction control rotor of either a mechanical pericyclic continuously variable transmission (CVT) as shown in FIG. 16 or an electromechanical pericyclic CVT as shown in FIG. 19 requires some power to control its rotation. Electric power may be supplied from a separate power source, i.e., a battery, with a mechanical pericyclic CVT, or in the case of the electromechanical pericyclic CVT embodiment recycled from the electricity generated during the operation of this system. The electromechanical pericyclic CVT will perferably produce direct current (DC) electricity which will require an inverter to produce alternating current (AC) electricity to power the reaction control rotor or for battery storage or for other uses (i.e., powering other electronic devices, supply to an electricity distribution network, and the like). A plurality of inverters may be employed, including the integration of an inverter within the electromechanical pericyclic CVT system.

Figure 21:
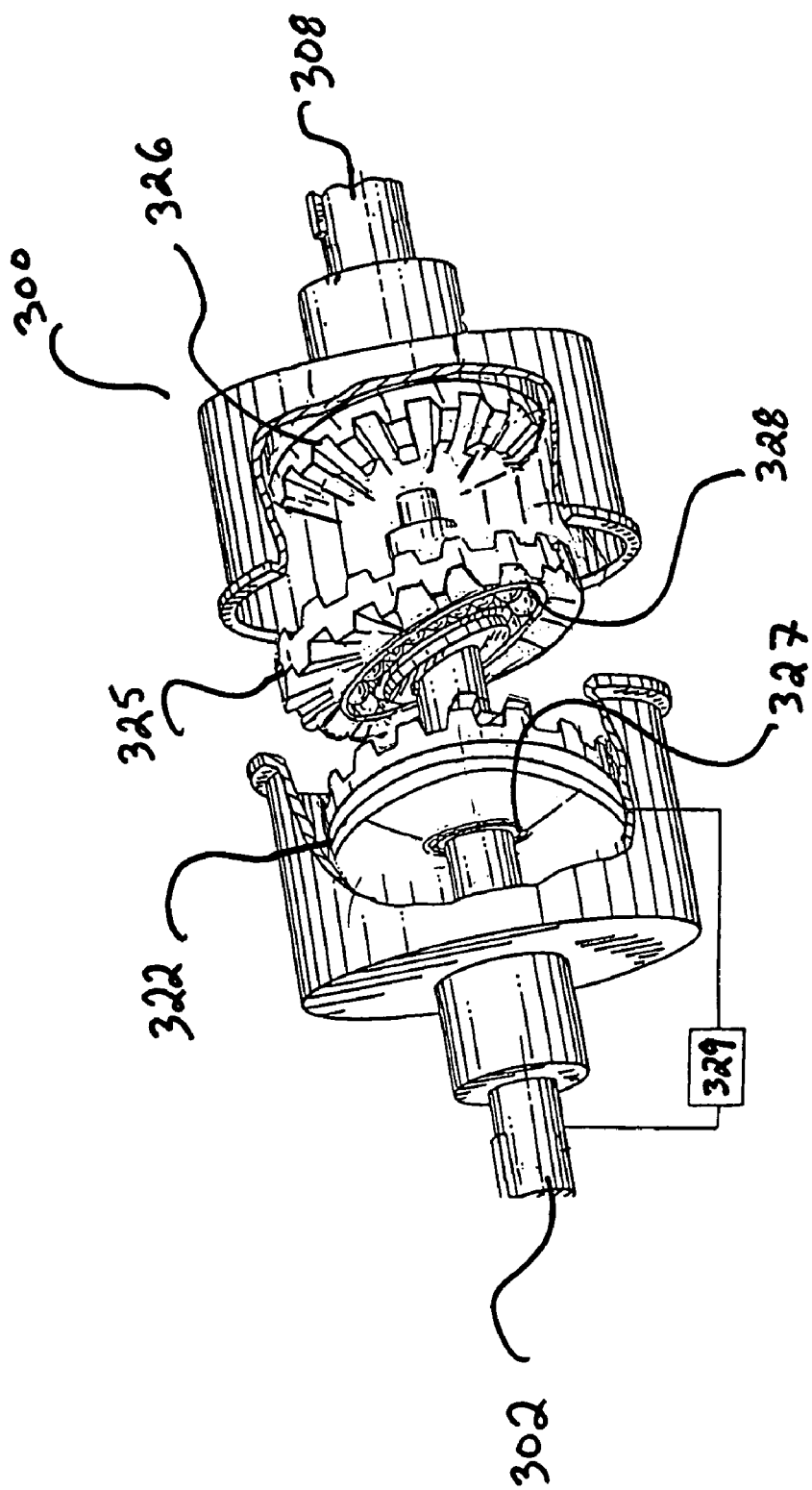
FIG. 21 is an exploded perspective view, partially cut away and shown in section, of a bevel gear embodiment of the continuously variable power transmission of the present invention.

A bevel gear embodiment of the invention is shown in the exploded perspective view of FIG. 21. Referring to FIG. 21, this bevel gear embodiment 322 has an input shaft 302, an output shaft 308, a reaction control rotor 322 with internal bevel gear teeth, a support bearing 327 for the reaction control rotor 322, a two-faced external bevel gear pericyclic motion converter 325, an output rotor 326 with internal bevel gear teeth, and an electronic controller 329.

Figure 22:
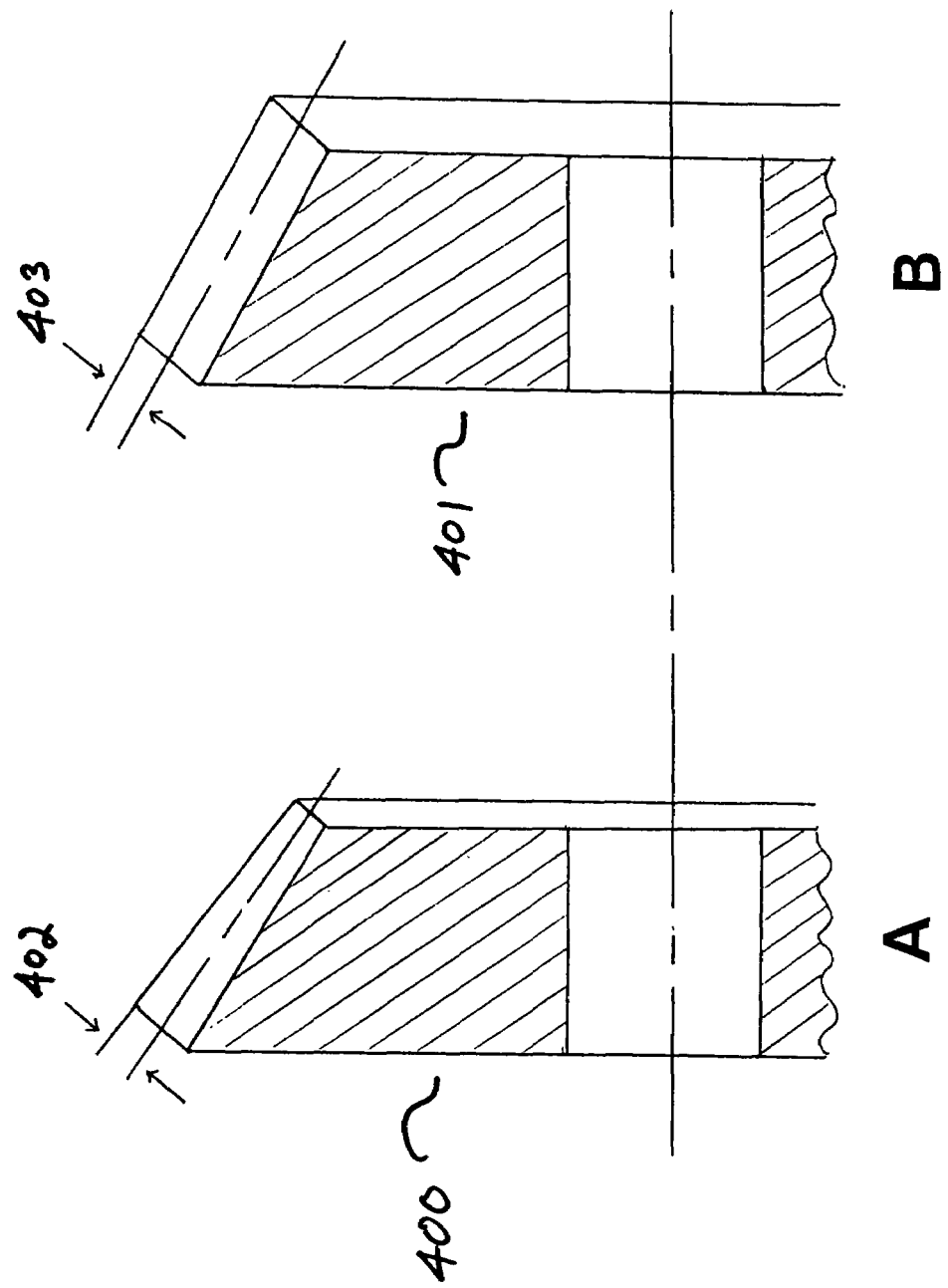
FIG. 22 is a cross section of external bevel face-type gears A and B showing the depth of a state-of-the-art tapered tooth (A) and the depth of a parallel tooth embodiment of the invention.

A cross section of external bevel face-type gears A and B showing a bevel gear tooth 400 having the depth of a state-of-the-art tapered tooth (A) and a bevel gear tooth 401 having the depth of a parallel tooth embodiment (B) of the invention is shown in FIG. 22. The standard addendum 402 of a state-of-the-art bevel gear with tapered tooth depth is contrasted with the extended profile addendum 403 with parallel tooth depth of the advanced pericyclic congruent bevel gears of the invention.

Figure 23:
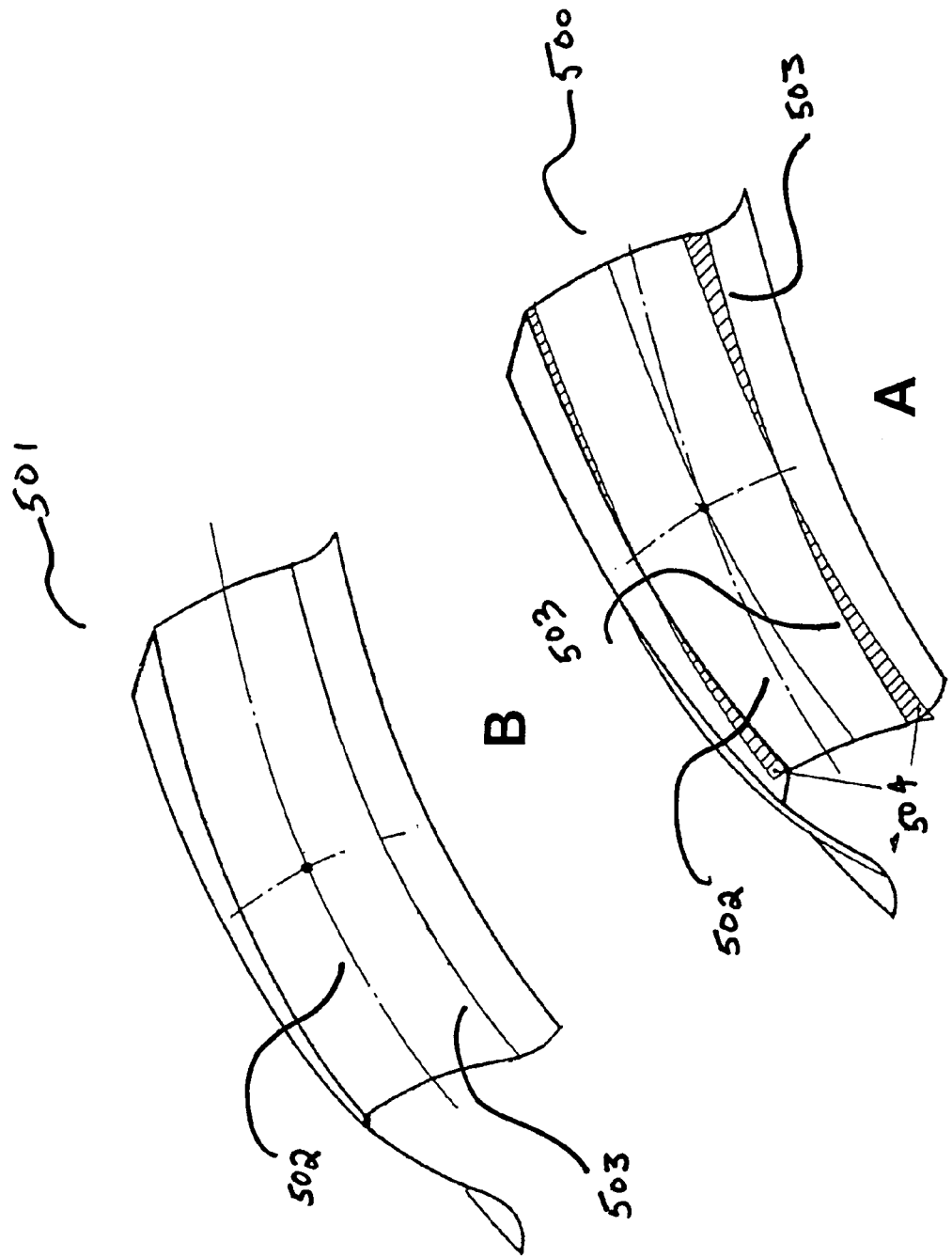
FIG. 23 is a detail tooth elevation view illustrating features of a state-of-the-art external bevel gear tooth (A) and an external pericyclic congruent face-type bevel gear tooth of the invention.

A detail tooth elevation view illustrating features of a state-of-the-art external bevel gear tooth (A) and an external pericyclic congruent face-type bevel gear tooth of the invention (B) is shown in FIG. 23. This figure shows a state of-the-art bevel gear tooth 500 and an advanced pericyclic congruent face type bevel gear tooth of the invention. Shown with both teeth is the root line 503, the pitch line 502, and the lost or unusable contact areas 504 of typical state-of-the-art bevel gears.

The positive contacting variable advanced bevel face gear type embodiment of the invention facilitates lower manufacturing and assembly cost due to its simplified low parts architecture. Face type spherical cam teeth of the two rotor and the two sets of tapered rollers on the pericyclic motion converter represent the most efficient method of load transfer via theoretically pure rolling contact. The advanced geometry bevel face type gear embodiment represents a considerably lower manufacturing and assembly cost accompanied with a small load transfer efficiency reduction due to a small percentage of sliding action during rolling torque transfer. The reaction control rotor and the output rotor are embodied with advanced geometry internal bevel face gear type teeth. The pericyclic motion converter is embodied with back-to-back external bevel face gear type teeth. Due to the pericyclic kinematic architecture design features, the advanced geometry face type bevel gears will traverse a longer path of action than is possible with state-of the-art bevel gears; thereby providing a considerably improved power density not possible or practical with traction based or traction/gear based CVTs. The unique pericyclic kinematics/kinetic features permit the advanced geometry bevel face gear type teeth which are embodied on both sides (i.e., back-to-back) of the pericyclic motion converter to simultaneously engage a full quadrant of the reaction control rotor internal advanced geometry bevel face gear type teeth and the output rotor internal advanced geometry bevel face gear type teeth; thereby, the transmitted load is always shared by 50% (i.e., two quadrants) of the bevel gear teeth. The profile contact ratio becomes an order of magnitude greater than state-of-the-art bevel gear drives. By virtue of the design architecture, the pericyclic CVT has a very high degree of load sharing among its components. A common measure of the degree of load sharing that is widely used in gear transmission technology is the profile contact ratio. The contact ratio as applied to state-of-the-art spur, helical, and bevel gears may be thought of as the average number of teeth which share the load during a meshing cycle. Broadly interpreted, a contact ratio of 1.3 would indicate that at least one pair of teeth carry load during 100% of the meshing cycle; while for about 30% of the cycle, the load is shared between two tooth pairs. Typical values of the contact ration for spur gears are in the range of 1.2–2.1.

Helical and spiral bevel gears would have somewhat higher contact rations; however, the load capacity may only be improved by 10–20%. In the case of the bevel gear embodiment of the pericyclic CVT of the invention, a substantial length of each bevel tooth which is in contact carries load. Therefore, the load capacity of the bevel gear embodiment pericyclic CVT will substantially improve with increasing contact ratio. Since the contacts on the reaction control rotor and the output rotor sides of the pericyclic motion converter are essentially independent, the contact ratio for each side of the pericyclic motion converter will be different. However, in most case the contact ratio will be similar. Theoretically, the pericyclic motion converter can be in contact with both rotors over two full quadrants totaling 90 degrees of contacting gear teeth.

The pericyclic CVTs of the invention that embody advanced bevel face gear type teeth can be substantially further enhanced with additional product cost reduction features and capabilities by the substitution of magnetic bearing for conventional rolling element bearings. This enhancement will provide and facilitate the following improved features and capabilities: (1) reduce bearing related efficiency loses due to lubrication churning; (2) provide substantially higher rotational speeds via smaller size bearings; (3) reduce system complexity through reduced parts count; (4) eliminate lube oil system for bearings; (5) provide contamination free bearing operation; (6) reduce energy consumption; (7) operate at lower noise and vibration levels; and (8) permits operation in hostile environments (i.e., extreme hot and cold temperatures).

By using high-hot-hardness alloy steel for the bevel gear teeth instead of the conventional AISI 9310 steel and high temperature tribological surface treatments along with applied chemical break-in coating to permit thin film oblation transfer in the concentrated Hertzian contact zones during tooth load transfer will permit extensive save operation in the event of lube oil loss. For selective applications, a lube oil system may not be required.

As a result of the kinematic/kinetic features of the pericyclic motion converter, the rotation of the input shaft relative to the reaction control rotor member cause a differential motion of the output rotor driving member. Differential motion is the change in circular pitch indexing. Pericyclic motion is oscillating motion where the circumference of a disc nutates around the periphery of a body and displaces the output rotor circumferentially resulting in the transfer of torque along a spherical path of action providing variable speed and ration change. In the power transmission of the invention, the pericyclic motion converter engages in pericyclic motion (i.e., oscillation, nutation, rotation and stepless circular pitch indexing) thereby transferring variable torque and rotational speed or constant torque and rotational speed to the output rotor driving member.

Preferably in the bevel gear embodiment of the invention, both the reaction control member and the output rotor member have selected embodied face type internal bevel gear teeth each tooth of which has a pitch angle greater than 90 degrees. The pericyclic motion converter member preferably has selected back-to-back conjugate embodied face type external bevel gear teeth. All member bevel gear teeth of the reaction control member, the output rotor member and the pericyclic motion converter are designed with unique advanced profile geometries that include parallel tooth whole depth, common, extended profile addendums, and congruent tooth lengthwise curvature modifications as illustrated in FIGS. 22 and 23. These profile geometries reduce running noise, increase the profile contacts and maximize load transfer capability over an increased pericyclic kinematic path of action when compared to known state-of-the-art bevel gear transmissions. By virtue of pericyclic kinematics and the selected embodied advanced profile geometries of the face type internal/external conjugate bevel gear teeth of the three load transfer members (i.e., pericyclic motion converter; reaction control rotor; output rotor), the transmitted load is shared by approximately 50% of all system gear teeth during simultaneous contact of the pericyclic motion converter teeth meshing with the reaction control rotor teeth and at 90 degrees apart meshing with the teeth of the output rotor. This extensive high profile contact ratio provides a major improvement in power density (i.e., small size and weight) and cost of fabrication when compared to other known CVT types (i.e., traction based and traction/gear based).

The reaction control rotor member (with selected embodied face type bevel gears with pitch angle greater than 90 degrees), the output rotor member (with selected embodied face type bevel gears with pitch angle greater than 90 degrees), and the pericyclic motion converter member (with selected back-to-back conjugate embodied face type bevel gears all with innovative tooth profile geometry including parallel tooth depth, extended high-contact tooth profile addendums and congruent generated tooth flank lengthwise curvature modification) minimizes running noise and maximizes load transfer capability over an increased pericyclic kinematic path of action.

In the bevel gear embodiment of the invention, there are several gear combinations that may be employed involving the reaction control rotor member, the pericyclic motion converter member, and the output rotor member. For example, if the pericyclic motion converter is a two-sided (back-to-back) external bevel gear configuration, then the reaction control rotor member and the output rotor member are each internal bevel gear configurations, or alternatively, each rotor may be external bevel gear configurations. If the pericyclic motion converter member is a two-sided internal bevel gear configuration, then the reaction control rotor member and the output rotor member are each external bevel gear configurations. If the pericyclic motion converter is a two-sided structure consisting of one side being an external bevel gear configuration and one side being in internal bevel gear configuration, then the internal bevel gear side must always mate appropriately with an external bevel gear rotor configuration; the external bevel gear side may mate appropriately with a rotor (either the reaction control rotor member or the output rotor member) which is either an external bevel gear configuration or an internal bevel gear configuration. In all cases, only internal bevel gear configurations have gear teeth with pitch angles greater than 90 degrees.

The pericyclic continuously variable transmission of the invention has basic speed ratio features. All conventional gear transmission systems, including bevel gear and planetary gear types, transfer load and change rotational speed via mating gear teeth having a common circular pitch (i.e., the same diametral pitch). Unlike conventional gear systems, the pericyclic continuously variable transmission mating load/speed transfer elements (i.e., mating bevel type face teeth or cam type face teeth mating with roller elements) do not have a common circular pitch. This lack of a common circular pitch is the prime parameter upon which the pericyclic continuously variable transmission's variable/constant speed ratio stepless indexing changes are dependent. Therefore, the pericyclic continuously variable transmission can accept variable input rotational speed from a mechanical or electrical prime source and convert the input variable speed and associated load to a controlled constant speed load without additional hardware components. This capability is accomplished by exchanging the number of reaction control rotor member speed/load transfer elements (i.e., bevel type face gear teeth or cam face like teeth) with the number of output rotor member speed/load transfer elements. Accordingly, the pericyclic continuously variable transmission of the invention can take constant input speed and convert it to variable output speed, or, alternatively with the above modification take variable input speed and convert it to constant output speed. Due to the pericyclic continuously variable transmission's inherent kinematic features, the pericyclic motion converter member will always oscillate; however, it may or may not rotate with respect to the housing depending on the selected pericyclic design half angle (i.e., inclination mounting on the input shift axis. That is, for one complete rotation of the input shaft, the pericyclic motion converter member may or may not return to its original angular orientation with respect to the reaction control rotor. If the number of load transfer elements on the reaction control rotor and the number of load transfer elements on the reaction control rotor side of the pericyclic motion converter member are identical, the pericyclic motion converter member will oscillate with respect to the reaction control rotor, but will not undergo any net nutational motion. For other condition, the pericyclic motion converter member will steplessly index with each rotation of the input shaft member.

When the number of load transfer elements on the reaction control rotor side of the pericyclic motion converter are greater than the number of load transfer elements on the reaction control rotor member, the pericyclic motion converter will rotate in the same direction as the input member When the number or load transfer elements on the reaction control rotor side of the pericyclic motion converter are equal to the number of load transfer elements on the reaction control rotor member, the pericyclic motion converter does not rotate.

When the number of load transfer elements on the reaction control rotor side of the pericyclic motion converter are smaller than the number of load transfer elements on the reaction control rotor, the pericyclic motion converter rotates in the direction opposite to that of the input member.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for continuously varying the ratio of rotational speed of an input shaft member relative to the rotational speed of an output shaft member of a pericyclic power transmission, wherein said pericyclic transmission comprises said input shaft member, said output shaft member, a pericyclic motion converter member rotably mounted on said input shaft or a retaining ring member at a selected design angle, a reaction control rotor member journaled to said input shaft member, a controller means, and an output rotor member fixed to said output shaft member, wherein said pericyclic motion converter member is in simultaneous driving contact with said reaction control rotor member and said output rotor member, said method comprising the steps of:

inputting mechanical torque and rotational speed to said input shaft member and thereby to said pericyclic motion converter member mounted thereon to convert said mechanical torque and rotational speed to torque and pericyclic motion; and controlling the rotation of said reaction control rotor with said controller means;

transferring said mechanical torque and converting said input shaft rotation to pericyclic motion of said pericyclic motion converter to rotational speed and torque of said output rotor member and said output shaft member affixed thereto, thereby varying the rotational speed of said input shaft member relative to the rotational speed of said output shaft member.

2. The method of claim 1, wherein said rotational speed of said input shaft member is constant and said rotational speed of said output shaft member is variable.

3. The method of claim 1, wherein said rotational speed of said input shaft member is variable and said rotational speed of said output shaft member is constant.

4. The method of claim 1, wherein said reaction control rotor member consists of a plurality of forwardly directed internal face or bevel gear teeth, said output rotor member consists of a plurality of rearwardly directed internal face or bevel gear teeth, and said pericyclic motion converter member consists of a plurality of back-to-back conjugate embodied face or external bevel gear teeth.

5. The method of claim 1, wherein said reaction control rotor member consists of a plurality of forwardly directed reaction face cams, said output rotor member consists of a plurality of rearwardly directed output face cams, and said pericyclic motion converter member consists of a plurality of load transmitting follower members.

6. The method of claim 1, wherein said pericyclic transmission further comprises integrated or embodied motor/generator components; said reaction control rotor member and said output rotor member are selected from the group consisting of a plurality of internal or external bevel gear teeth, a plurality of internal or external face pear teeth, and a plurality of reaction face cams; said pericyclic motion converter is selected from the group consisting of a plurality of back-to-back conjugate embodied external or internal bevel gear teeth, a plurality of internal or external face pear teeth and a plurality of load transmitting follower members; and wherein said pericyclic motion converter consists of back-to-back conjugate embodied external or bevel gear teeth, then said reaction control rotor member consists of forwardly directed internal face or bevel gear teeth and said output rotor member consists of rearwardly directed internal face or bevel gear teeth; and wherein if said pericyclic motion converter consists of back-to-back conjugate embodied internal face or bevel pear teeth, then said reaction control rotor member consists of forwardly directed external face or bevel gear teeth and said output rotor member consists of rearwardly directed external face or bevel gear teeth; and wherein if said pericyclic motion converter consists of a plurality of load transmitting follower members, then said reaction control rotor member consists of a plurality of forwardly directed face cams and said output rotor member consists of a plurality of rearwardly directed face cams; said method further comprising the step of:

generating electric power while simultaneously varying the rotational speed of said input shaft member relative to the rotational speed of said output shaft member.

7. The method of claim 6, further comprising the step of: recycling at least a portion of said generated electric power to power said reaction control rotor member.

8. The method of claim 1, wherein said reaction control rotor member and said output rotor member comprise a plurality of embodied external face or bevel gear teeth with profile geometries that comprise parallel tooth whole depth, extended profile addendums, and congruent lengthwise curvature modification; wherein said pericyclic motion converter member comprises back-to-back conjugate embodied external face or bevel gear teeth and profile geometries that consist of parallel tooth whole depth, extended profile addendums, and congruent tooth lengthwise curvature modifications.

9. The method of claim 8, wherein said reaction control rotor member and said output rotor member comprise a plurality of embodied external bevel or face gear teeth with profile geometries that consist of parallel tooth whole depth, extended profile addendums, and congruent lengthwise curvature modification; wherein said pericyclic motion converter member comprises back-to-back conjugate embodied external bevel or face gear teeth that comprise profile geometries of parallel tooth whole depth, extended profile addendums, and congruent tooth lengthwise curvature modifications.

10. A continuously variable speed power transmission comprising:

an input shaft member rotatable about an input axis;

an output shaft member rotatable about an output axis;

an output rotor member rotable about said output axis fixed to said output shaft member including a plurality of rearwardly directed internal face or bevel gear teeth thereon;

a conjugate reaction control rotor member journaled to said input shaft member for selective rotation about said input axis including a plurality of forwardly directed internal face or bevel gear teeth thereon;

a controller means for selectively adjusting the rate of rotation of the reaction control rotor member relative to the input shaft member;

a pericyclic motion converter member rotable mounted at a fixed angle for pericyclic motion about the input axis consisting of two sides each having a plurality of conjugate embodied face external bevel or face gear teeth in simultaneous engagement with said internal bevel or face gear teeth of said reaction control rotor member and said internal bevel or face gear teeth of said output rotor member;

wherein said face or bevel gear teeth of said reaction control rotor member and said output rotor member have pitch angles greater than 90 degrees embodied thereon, and profile geometries that comprise parallel tooth whole depth, extended profile addendums, and congruent lengthwise curvature modification; and wherein said face or bevel gear teeth of said pericyclic motion converter comprise parallel tooth whole depth profile geometries, extended profile addendums, and congruent lengthwise curvature modification;

whereby relative rotation between the reaction control rotor and the input member results in pericyclic motion of the conjugate pericyclic motion converter member about the input axis and thereby results in a continuously variable change of ratio of the rotational speed of the output shaft member relative to the input member.

11. The continuously variable speed power transmission of claim 10, further comprising integrated motor/generator components.

12. The continuously variable speed power transmission of claim 10, wherein said external face or bevel gear teeth of said pericyclic motion converter comprise parallel tooth whole depth profile geometries, extended profile addendums, and congruent lengthwise curvature modification.

13. The continuously variable speed power transmission of claim 10, wherein said internal face or bevel gear teeth of said reaction control rotor member and said output rotor member comprise pitch angles greater than 90 degrees, parallel tooth whole depth profile geometries, extended profile addendums, and congruent lengthwise curvature modification.

14. The method of claim 1, wherein said reaction control rotor member consists of a plurality of forwardly directed external face or bevel gear teeth, said output rotor member consists of a plurality of rearwardly directed external face or bevel gear teeth, and said pericyclic motion converter member consists of a plurality of back-to-back conjugate embodied internal face or bevel gear teeth.

15. The method of claim 1, wherein said controller means is electronic.

16. The method of claim 1, wherein said controller controlling the rotation of said reaction control rotor selectively adjusts the rotation of the reaction control rotor relative to the rotation of said input shaft member.

17. The continuously variable power transmission of claim 10, wherein said controller means is electronic.

* * * * *